(12) United States Patent
Haas et al.

(10) Patent No.: US 6,190,714 B1
(45) Date of Patent: Feb. 20, 2001

(54) METHOD AND APPARATUS FOR MANUFACTURING FILLED WAFER BLOCKS

(75) Inventors: Franz Haas, Vienna; Johann Haas, Klosterneuburg; Erich Koletnik, Klosterneuburg/Kierling, all of (AT)

(73) Assignee: Franz Haas Waffelmaschinen-Industrie Aktiengesellschaft, Vienna (AT)

( * ) Notice: Under 35 U.S.C. 154(b), the term of this patent shall be extended for 0 days.

(21) Appl. No.: 09/194,039

(22) PCT Filed: Jun. 6, 1997

(86) PCT No.: PCT/AT97/00114

§ 371 Date: Nov. 17, 1998

§ 102(e) Date: Nov. 17, 1998

(87) PCT Pub. No.: WO97/47204

PCT Pub. Date: Dec. 18, 1997

(30) Foreign Application Priority Data

Jun. 7, 1996 (AT) .......................................... 983/96

(51) Int. Cl.$^7$ .............................. A21D 13/00; A23G 3/00
(52) U.S. Cl. .............................. 426/275; 426/89; 426/94; 426/144; 99/450.4
(58) Field of Search ..................................... 426/275, 297, 426/302, 303, 496, 502, 512, 89, 94, 144; 99/450.4, 450.7

(56) References Cited

U.S. PATENT DOCUMENTS

| | | |
|---|---|---|
| 2,868,141 | 1/1959 | Griner . |
| 3,343,504 | 9/1967 | Beik . |
| 4,246,290 * | 1/1981 | Haas, Sr. et al. ..................... 426/275 |
| 4,359,920 * | 11/1982 | Haas, Sr. et al. ................... 83/404.2 |
| 4,361,082 * | 11/1982 | Haas, Sr. et al. ................... 99/450.4 |
| 4,440,072 * | 4/1984 | Haas, Sr. et al. ................... 99/450.4 |
| 4,454,834 * | 6/1984 | Haas, Sr. et al. ..................... 118/676 |
| 4,518,617 | 5/1985 | Haas . |
| 4,550,655 * | 11/1985 | Haas, Sr. et al. ................... 99/450.4 |
| 4,567,049 * | 1/1986 | Haas, Sr. et al. ..................... 426/275 |
| 4,579,030 * | 4/1986 | Haas, Sr. et al. ................... 83/404.2 |
| 4,580,489 * | 4/1986 | Hass, Sr. et al. ....................... 99/450 |
| 4,602,590 * | 7/1986 | Hass, Sr. et al. ........................ 118/13 |
| 4,669,603 * | 6/1987 | Hass, Sr. et al. ..................... 198/432 |
| 5,178,677 * | 1/1993 | Hass et al. ............................. 118/25 |
| 5,201,403 * | 4/1993 | Hass, Sr. et al. ..................... 198/575 |
| 5,253,743 * | 10/1993 | Hass, Sr. et al. ................. 198/347.1 |

FOREIGN PATENT DOCUMENTS

| | | |
|---|---|---|
| 373 473 | 1/1984 | (AT) . |
| 1 288 895 | 2/1969 | (DE) . |
| 29 13 042 | 10/1979 | (DE) . |

* cited by examiner

Primary Examiner—Milton Cano
(74) Attorney, Agent, or Firm—Herbert Dubno

(57) ABSTRACT

Filled wafer blocks are made by feeding preliminary blocks at a lower level to a stacking station and then feeding a wafer sheet coated on an upper side with a spread to that location, gripping them and inverting them as they are laid on the lower block to form a filled block in the production of filled wafers and the like. The filled wafer blocks can also have uncoated sheets laid onto the blocks.

76 Claims, 6 Drawing Sheets

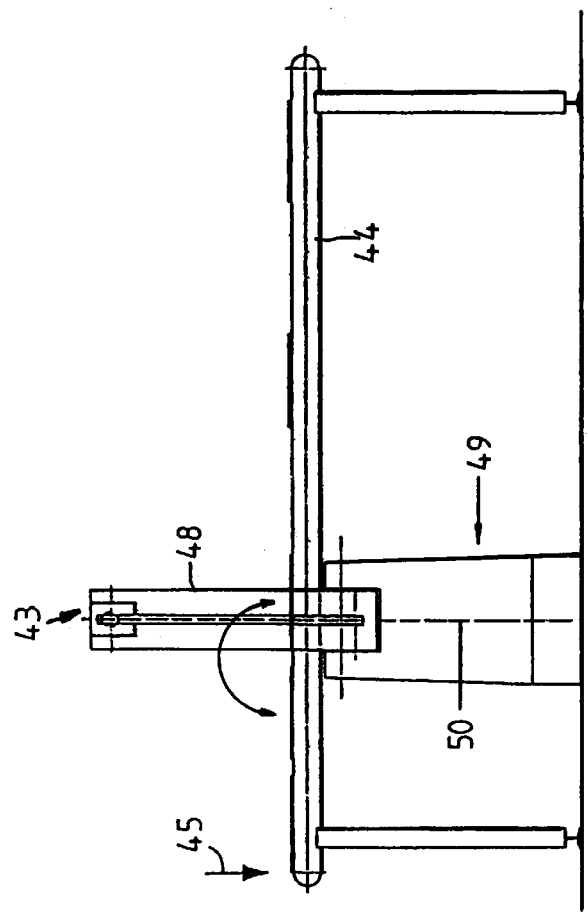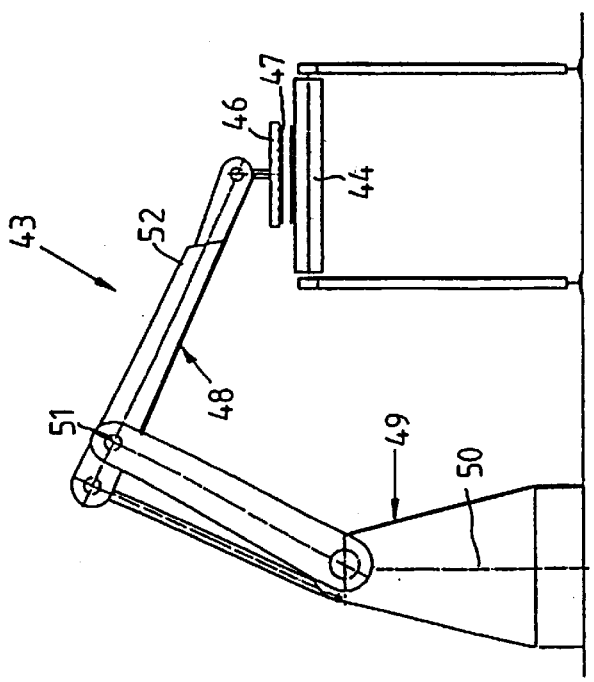

METHOD AND APPARATUS FOR MANUFACTURING FILLED WAFER BLOCKS

CROSS REFERENCE TO RELATED APPLICATIONS

This application is a national stage of PCT/AT97/00114 filed Jun. 6, 1997 and based upon Austrian national application A983/96 filed Jun. 7, 1996 under the International Convention.

FIELD OF THE INVENTION

The invention relates to the production of filled wafers. Filled wafers are for instance large, basically rectangular wafer blocks with a short height in relation to their size, which are bordered on their upper and lower sides respectively by a flat, rectangular wafer sheet and/or by a rectangular wafer sheet provided with bulges, and are filled with a spread between the wafer sheets The large filled wafer blocks are divided into small filled wafers in the form of either small rectangular wafer pieces, or small filled hollow wafers each corresponding to a bulge in the wafer block.

STATE OF THE ART

In the baked goods, wafer and sweets field large basically rectangular filled wafer blocks, with a short height in relation to their size are known. They consist of large wafer sheets, thin in relation to their size, and layers of spread between the wafer sheets. These wafer blocks are bordered respectively on their upper side by an uppermost wafer sheet and on their bottom side by a lowermost wafer sheet. These wafer blocks are divided into small rectangular wafer pieces or into small hollow bodies, each corresponding to a bulge.

The wafer blocks subsequently mentioned as "flat wafer blocks" each contain two or more flat rectangular wafer sheets and one or more layers of spread. The height of these wafer blocks corresponds to the height of the small filled wafer pieces to be produced therefrom. The length and width of these wafer blocks correspond to a multiple of the length and width of the small filled wafer pieces.

The wafer blocks subsequently mentioned as "wafer blocks provided with bulges" are also defined as so-called "filled hollow wafer blocks". In these wafer blocks, two flat rectangular wafer sheets, at least one of which has projecting bulges on its back side, are connected with each other at their frontal sides with a spread layer. Between the two wafer sheets there are hollow spaces corresponding to the bulges, which are defined by two opposite partial areas of the wafer sheets and are at least partially filled with the spread. Each wafer block provided with bulges contains several small, adjacent and laterally interconnected hollow bodies. Each of these hollow bodies consists of two parts, which complement each other in forming the configuration of the respective hollow body and are formed by opposite partial areas of the wafer sheets. The configuration of each of these body parts corresponds to the configuration of the respective partial area of the wafer sheet, which is either flat or provided with bulges. The filled hollow wafer block is divided between its bulges into small filled hollow wafers, each of them comprising a single hollow body at least partially filled with the spread and has an outer shell made of baked wafer dough. The outer shape of these small hollow bodies or of these small hollow wafers, can be for instance spherical or a hemispherical, cylindrical, cubical, acorn-shaped, walnut-shaped, hazelnut-shaped, praline-shaped, etc.

The small filled wafer pieces and the small filled hollow bodies are produced in industrial quantities on continuously working production lines which are set up for the respective final product. The large rectangular wafer blocks are an intermediate product which is manufactured in a sandwiching machine from spread and rectangular wafer sheets. In the respective production line the wafer blocks are chilled for hardening and later divided into small filled wafer pieces or into small filled hollow bodies.

The rectangular wafer sheets are produced in continuously operating automatic wafer-baking machines, whose maximal production capacity corresponds to a multiple of the processing capacity of the known sandwiching machines. The wafer sheets which are produced in the wafer-baking oven or the automatic wafer-baking machine, from a fluid wafer dough consisting mainly of wheat flour and water, are cooled in the respective production line or left to cool, and then transported to a cream-spreading device and further to the sandwiching machine. The wafer sheets have a crunchy, rough and slightly breakable consistency and a humidity content of a maximum 1–4% by weight.

In the production of large two-layer wafer blocks having bulges on the upper and the lower side it is known to transport the wafer sheets lying down in a transport device to a sandwiching machine, wherein the coated wafer sheets are folded together in pairs with their coated sides facing each other, thereby forming two-layer wafer blocks, which are deposited on a transport device and carried away by the same. The known sandwiching machine consists of a folding device arranged below the transportation plane of the transport device, whose folding elements lift the two wafer sheets of a wafer block from the transport device and swing them towards each other above the transport device. After the block formation, the folding elements are again swung apart, thereby depositing the wafer block on the transport device. The wafer block is carried away, out of the operating range of the folding device and its folding elements are lowered below the transport level. When the operation zone of the of the folding device is free again, the two wafer sheets of the next wafer block are transported within the operating range of the folding device and stopped there. Then the folding device is again set into action and the next wafer block is formed. The working rhythm of the folding device and the pauses between two successive block formations are attuned to the intermittent supply of the wafer sheets in pairs and are influenced by the size of the respective wafer sheets and by the weight and consistency of the spread layers. In order to keep within limits the effect of the mass inertia forces, generated while the wafer sheets are folded together, on the wafer sheets and their spread layers, the speed at which the folding elements move is increasingly reduced with the increasing size of the wafer sheets and the increasing weight of the spread layers, which necessarily leads to a longer work cycle of the folding device and to longer pauses between successive block formations. Therefore the production capacity which can be achieved in the processing of wafer sheets into wafer blocks with the sandwiching machine designed as a folding device decreases with the increasing size of the wafer sheets and the increasing weight of the spread layers. Multiple-layer blocks can not be produced with a sandwiching machine based on a folding device.

In the production of large, flat wafer blocks with two or several layers it is known to feed the flat wafer sheets to a sandwiching device wherein the wafer sheets arriving one after the other on a lower level are individually lifted to a higher level, and formed into a block on its upper side, which is carried away from the upper side of the sandwiching device and subsequently is calibrated to a predetermined height. This sandwiching machine lifts each coated wafer sheet from a lower level and presses it from underneath with it coated upper surface against the uncoated bottom side of a wafer sheet located in the upper level. In the sandwiching device, each wafer sheet lies on curved holding members, moving from the lower level to the upper level, which are made of segments, projecting into the travel path of the wafer sheets, of two wire-like helical path rotating in countersense, whose axes of rotation lie outside the travel path of the wafer sheets. The curved holding members press from underneath against the bottom side of the wafer sheet and support the same only linearly. In this sandwiching device, the diameters and the mutual distance of the wire-like helical tracks are adjusted to the format of the wafer sheets and increase with the increasing size of the wafer sheets. In the case of large wafer sheets and heavy spread layers, this leads to increasing breaking danger for the coated wafer sheets during block formation.

In the wafer baking ovens wherein the wafer sheets are produced, the trend is towards larger and larger formats of the wafer sheets and towards constantly increasing production capacity of the wafer ovens, with shorter and shorter time periods for the discharge of the baked wafer sheets. Only a few years ago a wafer format of 230 mm×460 mm was a maximum. Today a format of 330 mm×700 mm is almost the rule, and the end of this development is not yet in sight. This trend requires the shortening of cycles in respective production lines connected to wafer baking ovens, and to increase the processing capability of the components integrated in these production lines for the coating of the wafer sheets, the processing of wafer sheets into wafer blocks, and for processing the wafer blocks into smaller wafer pieces or small hollow bodies.

OBJECTS OF THE INVENTION

It is an object of the invention to improve the block formation in the production of filled wafer blocks, particularly in the production of filled hollow wafer blocks.

It is a further object of the invention to facilitate the block formation for large wafer sheets, which are coated with thick spread layers and with heavy spread masses.

SUMMARY OF THE INVENTION

In order to achieve these objects, the invention provides a method for the production of filled wafer blocks, which are bordered on their upper side by a top wafer sheet and on their lower side by a bottom wafer sheet, with spread-coated wafer sheets in between. The wafer sheet for the bottom of the wafer block is fed as a single-layer preliminary block at a lower level to a stacking location, and the wafer sheets for the top of the wafer blocks are fed as upper wafer sheets to a stacking location at an upper level. According to the invention, at the stacking location for each separate wafer block a wafer sheet is taken up from the upper level, reversed in a guided motion and subsequently joined with the upper side of the single-layer preliminary block to form a two-layer wafer block, which has an uncoated top side and an uncoated bottom side.

For the production of multilayer filled wafer blocks the invention proposes to feed the wafer sheets for the bottom wafer sheets of the wafer block in the form of single-layer preliminary blocks to a stacking location at the lower level, to feed the wafer sheets for the rest of the wafer sheets of the wafer block as upper wafer sheets to the stacking location at an upper level, to take up an upper wafer sheet from the upper level for each separate wafer block, to reverse it in a guided motion and subsequently to join it with the upper side of a single-layer preliminary block forming a two-layer preliminary block with an uncoated top side and an uncoated bottom side, and for each further wafer sheet layer of the wafer block to be formed, to take up a further coated upper wafer sheet from the upper level, reverse it in a guided motion and subsequently to join it with its coated side with the uncoated upper side of the previously formed preliminary block.

The method of the invention allows for a considerable increase in the production capacity of the filled wafer blocks. This applies to wafer blocks which are formed only from coated wafer sheets, as well as to wafer blocks which are formed from coated and uncoated wafer sheets. The block formation which, depending on the number of wafer sheet layers of the finished wafer blocks, can be a single-phase or a multiple-phase block formation, can take place in parallel to the feeding of the wafer sheets to the stacking location and in parallel to the transport of the preliminary blocks through the lower level. The cycles for the supply of the wafer sheets to the stacking location can be clearly shortened and the wafer sheet throughput at the stacking location can be clearly increased. The wafer sheets can be continuously fed to the stacking location and the finished filled wafer blocks can be continuously carried away from the stacking location. The wafer blocks are each formed on their bottom wafer sheets, while these are moved further in the lower level. The guided motion of the upper wafer sheets reaches from their pickup from the upper level through the reversal and up to the point where they are joined with the upper side of the respective preliminary block. The guided motion of the upper wafer sheets allows for a clear increase in the travel speed along the path they are supposed to travel, without any negative influence of the mass forces thereby generated in the coated wafer sheets on their spread masses. The mass forces are determined by the configuration of this motion path, and by changing this configuration they can be intentionally controlled and influenced.

According to a further feature of the invention, each upper wafer sheet can be first reversed and then lowered in a guided motion.

According to yet another feature of the invention, each upper wafer sheet can be lowered in a guided motion to the lower level and reversed during this lowering motion.

According to further feature of the invention, each reversed upper wafer sheet can be synchronized with the motion of the respective preliminary block, before it is joined with the upper surface of the preliminary block.

According to a further feature of the invention, each reversed upper wafer sheet can be stopped before it is joined with the upper surface of the preliminary block.

According to a further feature of the invention, each upper wafer sheet can be guided to follow the respective preliminary block and then moved synchronously with the same, while it is joined with the upper side of the preliminary block.

According to further feature of the invention, the respective preliminary block can be guided to follow the reversed upper wafer sheet and moved synchronously with the same, while it is joined to the upper side of the preliminary block.

According to a further feature of the invention, each reversed upper wafer sheet, for the purpose of being joined with upper side of the respective preliminary block, can be set on the upper side of the preliminary block in a guided motion and pressed with its downwards facing side against the upper side of the preliminary block.

According to a further feature of the invention, for the purpose of joining the reversed upper wafer sheet with the upper side of the respective preliminary block, it is possible to raise the preliminary block and to press it against the downwards facing side of the reversed upper wafer sheet.

According to a further feature of the invention, each upper wafer sheet can be centered before it is picked up from the upper level.

According to a further feature of the invention, for each individual wafer block it is possible to register the position of its preliminary block in the lower level by means of a sensor monitor, and for its upper wafer sheets to be picked up from the upper level only then when its preliminary block was registered by the sensor monitor.

The apparatus of the invention for the production of filled wafer blocks, which are bordered on their upper side by a top wafer sheet and on their lower side by a bottom wafer sheet, with wafer sheets filled with spread in between is provided with a sandwiching device which joins the wafer sheets to wafer blocks and has two transport devices arranged one above the other, which supply the wafer sheets to the sandwiching device at a lower and an upper transport level. According to the invention, this apparatus is characterized in that the sandwiching device cooperates with the lower transport device which supplies the lower wafer sheets to the sandwiching device as single-layer preliminary blocks, supports the preliminary blocks during block formation and carries away the finished wafer blocks from the sandwiching device. The upper transport device supplies the remaining wafer sheets of the wafer block to the sandwiching machine as upper wafer sheets ends in front of the sandwiching device. The sandwiching device is designed as a transfer device which transfers the upper wafer sheets to the preliminary blocks, and has a movable transfer head which can be moved back and forth between a receiving point for the upper wafer sheets located close to the end of the upper transport device and a discharge point for the upper wafer sheets located close to the lower transport device. The transfer head has an end provided with a holding device for the upper wafer sheets, which in its receiving position is pointed upwards and in its discharge position is pointed downwards.

This apparatus allows for a clear increase of the production capacity of filled wafer blocks from coated wafer sheets, or from coated and uncoated wafer sheets. The single-phase or multiphase block formation can take place in parallel with the transport of the wafer sheets. This apparatus makes possible a continuous operation, whereby the upper and lower transport devices continuously supply the wafer sheets to the stacking location and the lower transport device continuously carries away the thereon formed filled wafer blocks from the stacking location.

The transfer head moves the respectively held upper wafer sheet with a guided motion from its receiving position to its discharge position, while reversing it, and lowers it towards the respective preliminary block. The guided motion of the transfer head allows for a marked increase of its speed along its given travel path, without any influence of the mass forces thereby generated in the coated wafer sheets on the spread mass of a wafer sheet held by the transfer head. The mass forces are determined by the configuration of the travel path and can be intentionally controlled and influenced by changing this configuration.

According to a further feature of the invention the holding device can have an air cushion which can be brought into contact with the uncoated underside of the upper wafer sheets and which can be actuated with negative pressure for seizing the upper wafer sheets and with overpressure for delivering the upper wafer sheets.

This construction makes possible an even distribution over the entire upper wafer sheet of the holding and pressure forces exerted by the holding device on the upper wafer sheet during block forming. This is advantageous in the case of large wafer sheets provided with a great number of bulges lying close to each other. The same applies to very large wafer sheets coated with heavy spread layers. The air cushion integrated in the holding device insures a large-surface support of the respective wafer sheet during its guided motion performed by means of the transfer head. As a result also wafer sheets coated with heavy cream layers can be processed into wafer blocks without the danger of breaking for the respective wafer sheet.

According to another feature of the invention, the transfer head can have a stop projecting beyond its frontal side, which is arranged on the frontal margin of the transfer head and which in the discharge position of the transfer head projects from above downwards over the frontal margin of the upper side of the respective preliminary block.

This construction facilitates the synchronization of the motion of the upper wafer sheet carried by the transfer head with the motion of the preliminary block trailing after the transfer head.

According to a further feature of the invention, the transfer head can have a rear stop projecting beyond its end, which is arranged at the rear margin of the transfer head and which in the discharge position of the transfer head projects from above downwards over the rear margin of the upper side of the respective preliminary block.

This construction facilitates the synchronization of the motion of the preliminary block with the motion of upper wafer sheet carried by the transfer head lagging behind the same.

According to a further feature of the invention, underneath the lower transport level an up and down vertically movable elevating platform associated with the delivery position of the transfer head can be provided. The platform has an upwardly facing support surface parallel to the lower transport level and a stop for the respective preliminary block perpendicular to the lower transport level.

This construction allows the joining of the wafer sheet held by the transfer head with the respective preliminary block, independently from the transfer motion of the transfer head.

According to a further feature of the invention, the transfer head can be swung between its receiving position and its discharge position about a horizontal pivot axis arranged between the lower and the upper transport level.

According to a further feature of the invention the transfer device can be designed as a multiaxial handling automaton assigned to the lower transport level, with an outrigger rotatable about a vertical axis and bendable about a horizontal axis, which has an arm rotatable about an axis perpendicular to the bending axis, at whose free end the transfer head is mounted.

The invention also includes a process for the production of filled wafer blocks which are bordered on their upper side by a top wafer sheet and on the lower side by a bottom wafer sheet, with wafer sheets filled with spread in between. In this process a preliminary block having respectively an uncoated upper side and an uncoated lower side of the wafer block to be formed and at least one more coated wafer sheet are fed to a stacking location at the same level. According to the invention at the stacking location the preliminary block is lifted in a guided motion and is set with its uncoated underside on top of the coated upper side of the next wafer sheet supplied to the stacking location and is joined together with the wafer sheet to form a wafer block.

For the production of multilayer filled wafer blocks the preliminary block is lifted at the stacking location in a guided motion and set from above, with its uncoated underside, on top of the coated upper side of the next wafer sheet fed to the stacking location, and joined with the same to form a further preliminary block having an uncoated upper side and uncoated underside. For each further wafer sheet layer of the wafer block to be formed, the previously formed wafer block is lifted in a guided motion and set from above, with its uncoated underside on top of the coated upper side of the next wafer sheet fed to the stacking location and joined therewith to form a wafer block.

This method allows for a marked increase of the production capacity of filled wafer blocks made of coated and uncoated wafer sheets. The block formation, which depending on the number of wafer sheet layers of the finished wafer blocks is either single-phased or multiphased, can take place in parallel with the transport of the wafer sheets to the stacking location, without interrupting the same. The block formation can take place at the stacking location parallel to the motion of the wafer sheets supplied to the stacking location. The guided motion of the preliminary blocks allows for a marked increase of their speed along the path they are supposed to travel, without any negative influence of the generated mass forces on the respective preliminary block. The mass forces are determined by the configuration of the motion path and can be controlled and influenced by changing this configuration.

According to a further feature of the invention, in order to join the uncoated underside of a preliminary block with the coated upper side of a wafer sheet, the preliminary block can be respectively set in a guided motion onto the upper side of the of wafer sheet, and pressed against this wafer sheet with its uncoated underside.

In this variant of the process the guided motion of the respective preliminary block is used for joining the preliminary block and the coated wafer sheet, which during this joining remains in the supply level.

According to a further feature of the invention, for the purpose of joining the uncoated underside of a preliminary block with the coated upper side of a wafer sheet, the respective wafer sheet can be lifted and pressed with its coated upper side against the uncoated underside of the preliminary block which is kept in a holding position.

In this process variant the joining of the preliminary block with the wafer sheet takes place independently from the guided motion of the respective preliminary block, which during the joining remains in its holding position above the supply level.

According to yet another feature of the invention, the preliminary block can be synchronized with the motion of the wafer sheet to be connected therewith, before it is joined with its uncoated underside to the coated upper side of the sheet.

According to a further feature of the invention, the preliminary block can be stopped before it is joined with its uncoated underside to the coated upper side of the wafer sheet to be connected.

According to a further feature of the invention, the preliminary block can follow in a guided motion the wafer sheet which has to be connected therewith and then synchronously moved with the sheet, while it joins the coated upper side of the same with its uncoated underside.

According to a further feature of the invention, the respective wafer sheet to be connected with the preliminary block can follow the preliminary block and can then be moved synchronously therewith, while the preliminary block is joined with its uncoated underside to the coated upper side of this wafer sheet.

According to another feature of the invention, outside the stacking location at first coated and uncoated wafer sheets can be joined in pairs to form two-layer wafer blocks filled with spread, which are then supplied to the stacking location as preliminary blocks for the formation of wafer blocks.

This process variant simplifies the block formation for large wafer sheets which are coated with thick spread layers and heavy spread masses. This process variant provides in each wafer block a separation in space and time of the first phase of its block formation from all subsequent phase of its block formation. The production of two-layer preliminary blocks filled with spread in the first phase of the block formation can also take place in parallel with the transport of the wafer sheets to the stacking location.

According to a further feature of the invention, uncoated wafer sheets can be supplied to the stacking location as preliminary blocks for the formation of wafer blocks.

In a further development the invention proposes an apparatus for the production of filled wafer blocks, which are bordered on their upper side by a top wafer sheet and at their lower side by a bottom wafer sheet and are filled with spread between their wafer sheets. According to the invention this apparatus is characterized in that a transport device is provided on which for each wafer block at least one preliminary block of this wafer block having an uncoated upper side and uncoated underside, and at least one further coated wafer sheet are supplied to the sandwiching device and the finished wafer blocks are carried away from the sandwiching device, and that the sandwiching device has a work head which can be moved back and forth with respect to the transport device between at least two operating positions, and which on its frontal side facing the transport device has a holding device comprising an air cushion which can be brought into contact with the respective preliminary block, which air cushion can be actuated with negative pressure for seizing the preliminary block and with overpressure for releasing it.

This apparatus allows for a marked increase in the capacity to produce filled wafer blocks made of coated and uncoated wafer sheets. The block formation, which can be either single-phased or multiphased depending on the number of wafer sheet layers of the finished wafer block, can take place in parallel with the supply of wafer sheets to the stacking location, without interrupting the same. This apparatus makes possible a continuous operation, whereby the block formation at the stacking location takes place in parallel with the motion of the wafer sheets supplied to the stacking location.

The work head moves the respective preliminary block seized by the holding device in a guided motion, back and forth between the work positions. Above the transport device, the work head can be moved vertically up and down in a guided motion, or can travel in a closed-circuit path in a guided motion.

During the production of the wafer block, the work head is constantly engaged with the uppermost wafer sheet of the wafer block via its holding device. With its air cushion, the work head grips the uppermost wafer sheet of the wafer block evenly and transfers the holding respectively pressure forces to be exerted during all phases of block formation to the respective preliminary block. The air cushion engages at the entire upper side of the uppermost wafer sheet. This is advantageous in the case of large wafer sheets coated with thick and heavy spread layers, respectively in the case of preliminary blocks formed from such wafer sheets.

According to a further feature of the invention, for producing two-layer filled preliminary blocks, along the segment of the transport device preceding the sandwiching device there are arranged one after the other an upper transport device for the supply of uncoated wafer sheets, a station for positioning the uncoated wafer sheets on separate coated wafer sheets lying on the transport device, and a calibrating device joining the coated and uncoated wafer sheet to form two-layer filled wafer blocks.

This construction is advantageous in the case of large wafer sheets supporting thick and heavy spread layers, from which in a phase preceding the block formation preliminary blocks having an uncoated top side and an uncoated bottom side are produced, which then can be more easily seized by the work head of the sandwiching device.

According to a further feature of the invention, the work head can have a stop projecting over its frontal side, which at the frontal margin of the work head projects downward over the uncoated underside of the preliminary block held by the holding device and is associated with the frontal margin of a coated wafer sheet lying on the transport device.

This construction facilitates the synchronization of the motion of the coated wafer sheet with the motion of the following preliminary block carried by the work head.

According to a further feature of the invention, the work head can have a rear stop projecting over its frontal side, which at the rear margin of the work head projects downwards over the uncoated underside of the preliminary block held by the holding device, and is associated with the rear edge of a coated wafer sheet lying on the transport device.

This construction facilitates the synchronization of the motion of the coated wafer sheet with the motion of the trailing preliminary block carried by the work head.

According to a further feature of the invention, underneath the transport level an elevating table associated with the work head, moving vertically up and down can be provided, which has an upwards facing support surface parallel to the transport level. and a stop arranged perpendicularly to the transport level for a wafer sheet lying on the transport level.

This construction allows the preliminary block held by the work head to be joined with the respective coated wafer sheet, independently from the movement of the work head.

According to a further feature of the invention, the sandwiching device can be designed as a handling automaton assigned to the transport device, which has an outrigger bendable about a horizontal axis, at whose free end the work head is attached.

According to another feature of the invention, the outrigger of the handling automaton carrying the work head can be rotatable about a vertical axis.

BRIEF DESCRIPTION OF THE DRAWING

The above and other objects, features, and advantages will become more readily apparent from the following description, reference being made to the accompanying drawing in which:

FIG. 10 is a side view of an apparatus for the production of filled wafer blocks with a sandwiching device to which the wafer sheets are fed on one level;

FIG. 11 is an end view of the apparatus in FIG. 10;

SPECIFIC DESCRIPTION

Figure 1:
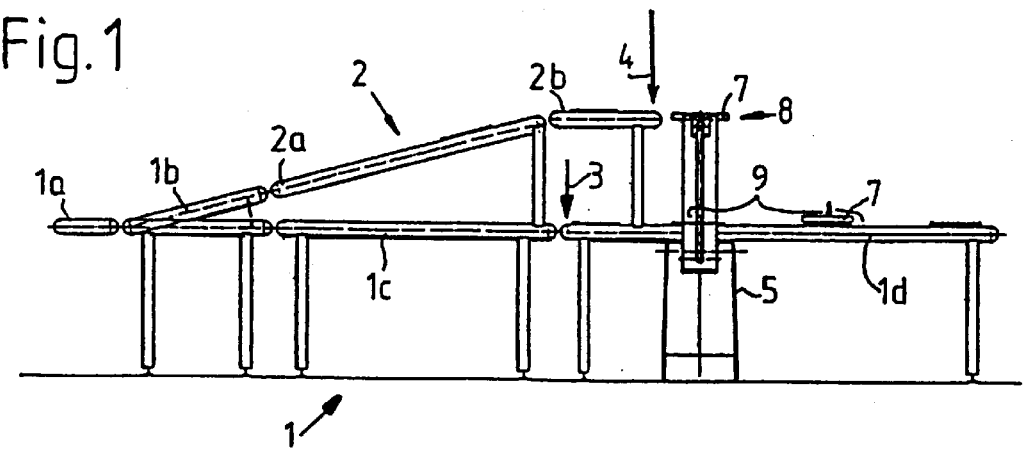
FIG. 1 is a side view of an apparatus for the production of filled wafer blocks, wherein the wafer sheets are fed to a transfer device on two levels arranged one on top of the other.
Figure 2:
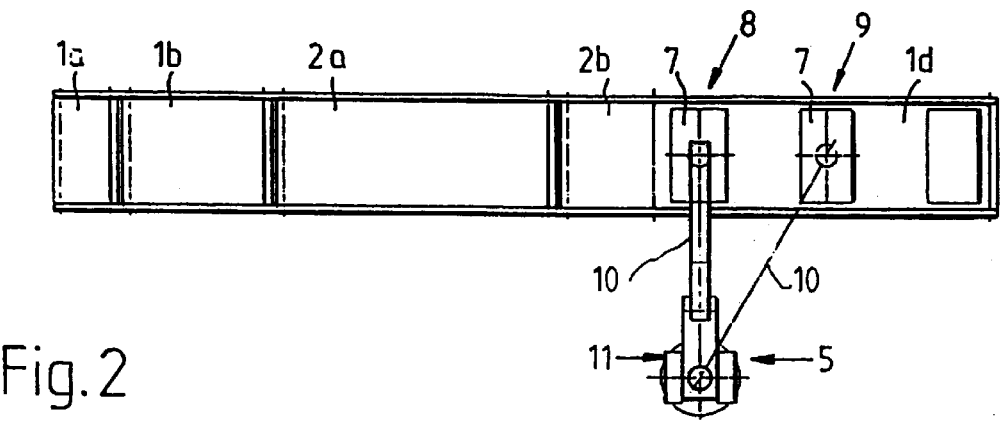
FIG. 2 is a top view of the apparatus according to FIG. 1.
Figure 3:
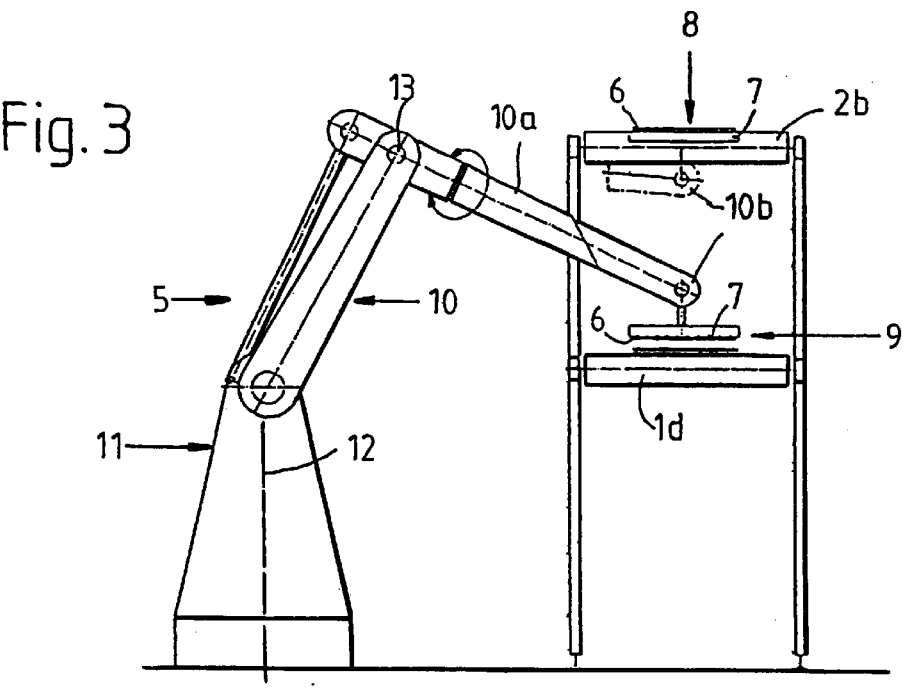
FIG. 3 is an end view of the apparatus according to FIG. 1.

FIGS. 1 to 3 show an apparatus for the production of filled wafer blocks which are produced in a single-phase or multiphase process from flat wafer sheets provided with bulges.

The apparatus comprises a transport device 1, consisting of several successive transport devices, which defines a lower transport level. On the first transport device 1*a* the wafer sheets are supplied to the apparatus. The second transport device 1*b* is designed as a transport switch, which transfers a part of the wafer sheets as lower wafer sheets to the lower transport level, to the third transport device 1*c* and the remaining wafer sheets as upper wafer sheets to an upper transport device 2 arranged above the third transport device 1*c*. The third transport device 1 sends the wafer sheets in the lower transport level to the fourth transport device 1*d*, which is associated with a sandwiching device and which is equipped with a sensor 3, which registers the wafer sheets in the lower level to be supplied to the sandwiching device.

The upper transport device 2 consists of a first segment 2*a* leading diagonally upwards from the lower transport level and of a subsequent segment 2b, which leads in an upper transport level to the sandwiching device and ends before the sandwiching device. At the end of the transport device 2 a sensor 4 is provided, which registers the wafer sheets to be supplied to the sandwiching device on the upper level.

The sandwiching device of the apparatus is designed as a transfer device 5 (FIG. 3), which has a transfer head 7 provided on its frontal side with a holding device 6 for the upper wafer sheets. The holding device 6 comprises an air cushion connected to a compressed air duct, which can be actuated with negative pressure for seizing and holding the upper wafer sheets, and with overpressure for the transfer and release of the upper wafer sheets.

The transfer head 7 is moved by the transfer device 5 back and forth between an upper receiving area, which is located close to the frontal end of the upper transport device 2, and a lower discharge area, which extends over the fourth transport device 1d. In the receiving area the transfer head 7 is turned upwards with its frontal side and is in its receiving position 8. In the discharge area the transfer head 7 is turned downwards with its frontal side and is in its discharge position 9, wherein it is moved along above the fourth transport device 1d to the end of the discharge area.

The transfer head 7 is mounted at the end of the outrigger 10 of the handling automaton 11, which moves the transfer head 7 back and forth in a guided motion, on the one hand between the receiving area and the discharge area of the transfer device 5, and on the other hand between its receiving position 8 and its discharge position 9. The outrigger 10 is rotatable about a vertical axis 12 and has a support arm 10a, swingable about a horizontal bending axis 13, which in turn has a segment 10b rotatable about the longitudinal axis of the support arm 10a, which is perpendicular to the bending axis 13, the transfer head 7 being mounted at the free end of this segment. A switch box (not shown) is mounted next to the handling automaton 11, which contains the control for the handling automaton 11 and is connected to the same via control lines.

In every single phase of block formation of a single or multiple phase block forming process, an upper wafer sheet is moved in a guided motion from the upper transport level to the lower transport level, thereby reversed and joined with the upper side of a preliminary block lying on the lower transport level to form a filled wafer block, which has an uncoated top side and an uncoated bottom side.

The upper wafer sheet is transferred by the upper transport device 2 to the transfer head 7, which is in its receiving position 8 in the upper receiving area of the transfer device 5. The holding device 6 of the transfer head 7 seizes the upper wafer sheet at its downwards facing uncoated side and holds it securely at the transfer head 7. Subsequently the handling automaton 11 moves the transfer head in a guided motion from its receiving position 8 to its discharge position 9, and at the same time from the receiving area to the discharge area of the transfer device 5. Thereby the upper wafer sheet held at the frontal side of the transfer head 7 is transported from the upper transport device 2b to the lower fourth transport device 1d and at the same time its previously upside facing side is turned downwards.

In the discharge area of the transfer device 5 the transfer head 7. which is now in its discharge position 9, is moved along by the handling automaton 11 above the fourth transport device 1d, and the reversed upper wafer sheet is joined with its downwards facing side to the upper side of the respective preliminary block to form a filled wafer block. The transfer head 7 deposits the reversed upper wafer sheet from above onto the preliminary block lying on the fourth transport 1d and presses it against the upper side of the latter. This pressure can be a result of the guided motion of the transfer head 7 itself, whereby then the negative pressure in the air cushion of the holding device 6 can be eliminated, and the upper wafer sheet of the just formed wafer block is released. The pressing of the reversed upper wafer sheet can be supported by the air cushion of the transfer head 7, whereby it is actuated with compressed air and the upper wafer sheet is pushed out of the holding device 6. After the release of the reversed upper wafer sheet by the transfer head 7, the handling automaton 11 moves the transfer head 7 back to its receiving position 8 and into the upper receiving area of the transfer device 5.

In the production of two-layer wafer blocks, the wafer sheet supplied in the lower transport level is the single-layer preliminary block of the single-phase block formation process, and the filled two-layer wafer block is the end product of the block formation, which is carried away by the fourth transport device 1d. The two-layer wafer blocks consist respectively of a wafer sheet downwardly bordering the wafer block, a second wafer sheet bordering the wafer block upwards and a layer of spread mass between the two wafer sheets. For the successive production of the two-layer wafer blocks, the first wafer sheets of the wafer blocks are supplied to the transfer device 5 in the lower transport level, and the second wafer sheets of the wafer blocks are supplied in the upper transport level.

In the production of a multilayer wafer block in a block formation process with a direct succession of block formation phases, the wafer sheet supplied at the beginning of the process in the lower transport level is the (single-layer) preliminary block of the first block formation phase and the first preliminary block of the block formation process. The end product of the first block formation phase is a filled two-layer wafer block lying on the lower transport level, which forms the (two-layered) preliminary block of the second block formation phase and the second preliminary block of the process. The end product of the second block formation phase is a filled triple layered wafer block lying on the lower transport level, which either represents already the finished product of the block formation and as such is carried away by the fourth transport device 1d, or it represents the preliminary block for a further, third block formation phase and remains on the lower transport level during this further block formation phase. The part of the block formation process corresponding to a single phase is repeated in the second and in each further block formation phase, until in the last block formation phase the wafer blocks reach the desired number of wafer sheet layers and are carried away by the fourth transport device 1d as finished products. The fourth transport device 1d can then be stopped until the multiple phase block formation process has ended, and then started again when the thereby produced finished multilayer wafer blocks have to be carried away.

In the second and in each further block formation phase, the above-described courses of motion are repeated with the second, respectively next upper wafer sheet supplied in the upper transport level. Thereby each time to the upper side of the previously formed preliminary block a further wafer sheet and a further spread layer are added. This way at the end of each block formation phase a filled wafer block results, whose uncoated upper side is formed by the now upwards facing underside of the coated wafer sheet reversed in the block formation phase and whose uppermost spread layer is formed by the spread mass of this latest reversed coated wafer sheet.

For the successive production of the filled multilayer wafer blocks, the respective wafer sheets for the lowermost wafer sheets of the wafer blocks are supplied as single-layer preliminary blocks to the transfer device 5 in the lower transport level, while the wafer sheets provided for the rest of the wafer sheets for the wafer block are supplied to the transfer device 5 as upper wafer sheets in the upper transport level.

The filled two-layer wafer blocks are produced in a single-phase block formation process. Each two-layer wafer block has an uncoated bottom side formed by the underside of the first wafer sheet, and an uncoated top side formed by the upwards facing underside of the second wafer sheet, after the second wafer sheet has been reversed. The spread mass lying between its two wafer sheets can originate from the first wafer sheet or from the second wafer sheet or from both wafer sheets.

If a wafer sheet coated on its upper side is supplied as a first wafer sheet to the transfer device 5 and as a second wafer sheet an uncoated wafer sheet is supplied, then the spread layer of the two-layer wafer block is formed only by the spread mass of the first wafer sheet.

If an uncoated wafer sheet is supplied to the transfer device 5 as a first wafer sheets and a wafer sheet coated on its upper side is supplied as a second wafer sheet, then the spread layer of the wafer block is formed only by the spread mass of the reversed second wafer sheet.

If respectively two wafer sheets each coated on the upper side are supplied to the transfer device 5 as first and as a second wafer sheet, then the spread layer of the two-layer wafer block is formed by the superposed spread masses of both wafer sheets.

If respectively flat wafer sheets are supplied as a first and as a second wafer to the transfer device 5, then the resulting two-layer wafer block is a flat wafer block, which is flat on its underside and on its upper side.

If to the transfer device 5 a flat wafer sheet is supplied as a first wafer sheet and a wafer sheet with bulges is supplied as a second wafer sheet, then the resulting two-layer wafer block is a wafer block having bulges only on its upper side.

If to the transfer device 5 a wafer sheet with bulges is supplied as a first wafer sheet and a flat wafer sheet is supplied as a second wafer sheet, then the resulting wafer block is a two-layer wafer block provided with bulges only on its underside.

If to the transfer device 5 wafer sheets with bulges are supplied as a first and as a second wafer sheet, then the resulting two-layer wafer block is a wafer block provided with bulges on its underside and on its upper side.

The filled triple-layer wafer blocks are produced in a two-phased block formation process. Each triple-layer wafer block consists of a first wafer sheet bordering the wafer block at the bottom, a second wafer sheet arranged in the middle of the wafer block, a third wafer sheet bordering the wafer block on the top, as well as a lower spread layer located between the first and the second wafer sheet and an upper spread layer located between the second and the third wafer sheet.

In the production of a triple-layer wafer block, in a first block formation phase an upper wafer sheet is picked up from the upper level, reversed and joined as a second wafer sheet of the wafer block with the first wafer sheet of the wafer block supplied at the lower level to form a two-layer preliminary block. In the second block formation phase a coated upper wafer sheet is taken up from the upper level, reversed and joined as a third wafer sheet of the wafer block with the with the previously formed preliminary block, to produce a finished triple-layer wafer block. The latter has now an uncoated top side formed by the uncoated underside of the reversed third wafer sheet of the wafer block, and an upper spread layer formed by the spread mass of the reversed third wafer sheet.

Figure 4:
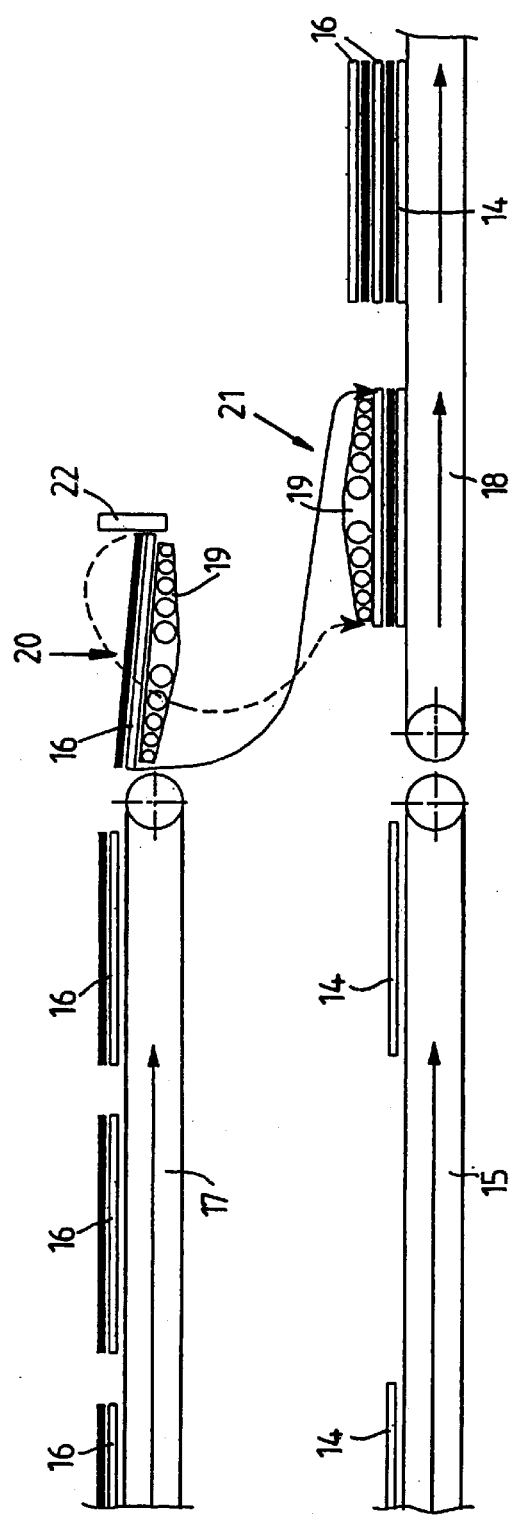
FIG. 4 is a schematic side view of a further embodiment of an apparatus for the production of filled wafer blocks, wherein the wafer sheets are fed to a transfer device on two levels arranged on top of one another.

FIG. 4 shows an installation for the production of filled wafer blocks in a block formation process, whereby triple-layer wafer blocks are produced from flat wafer sheets in two-phase block formation.

For the lowermost wafer sheets of the triple-layer wafer blocks uncoated flat wafer sheets are used. These are supplied as lower wafer sheets 14 by a lower feeding device 15 in a lower level of a sandwiching device. For the remaining wafer sheets of the triple-layer wafer block coated flat wafer sheets are used. These are supplied in an upper level to the sandwiching device as upper wafer sheets 16 by an upper feeding device 17. The sandwiching device is associated with a transport device 18, which in transport direction is arranged downstream of the feeding device 15 and on which the wafer blocks are formed and carried away.

The sandwiching device has a similar construction with the one of embodiment examples of FIGS. 1 to 3 and comprises a transfer head 19 provided at its frontal side with a holding device for the upper wafer sheets 16, which is mounted on the free end of a movable outrigger of a multiaxial handling automaton. The handling automaton moves the transfer head 19 in a guided motion from an upper receiving area associated with the upper feeding device 17 to a discharge area associated with the lower feeding device 15, thereby turning the transfer head from its receiving position 20 with upwardly facing frontal side to its discharge position 21 with downwardly facing frontal side. In the receiving area, the transfer head 19 with its upwards facing frontal side is located between the frontal end of the upper feeding device 17 and a stationary end stop 22, following the former in transport direction. On the frontal side of the transfer head 19 a holding device is provided which comprises a support surface for the uncoated underside of the upper wafer sheets 16 and an air cushion associated with the support surface.

Each block formation starts with a lower wafer sheet 14, which is transmitted by the lower feeding device 15 to the transport device 18 and is transported by the same to the discharge area of the sandwiching device. The transfer head 19 of the sandwiching device is turned into its receiving position 20 and is located in the receiving area between the frontal end of the upper feeding device 17 and the frontal end stop 22. The upper feeding device 17 transports an upper wafer sheet 16 onto the support surface of the transfer head 19 and slides it up to the stationary end stop 22. The upper wafer sheet lies with its uncoated lower side on the support surface and is there affixed to the transfer head by suction by means of the air cushion of the transfer head 19 actuated with negative pressure. Subsequently the transfer head 19 is lowered by the handling automaton in a guided motion from the receiving area to the discharge area, and thereby turned, together with the wafer sheet 16 it is holding, from its receiving position 20 to its discharge position 21, wherein the upper wafer sheet 16 faces downwards with its coated side.

Before the guided motion starts, the transfer head 19 turned in its receiving position, is located in the receiving area associated with the upper feeding device 17. The frontal margin of the transfer head 19 is arranged close to the end of the upper feeding device 17 and the rear margin of the transfer head 19 is arranged close to the stationary end stop 22. During the guided motion of the transfer head 19, its frontal margin is moved forwards in the transport direction of the two feeding devices 15 and 17, and its rear margin is moved backwards against this transport direction. At the same time the transfer head 19 with the upper wafer sheet 16 is brought close to the lower wafer sheet 14 lying on transport device 18 and the reversed upper wafer sheet 16 is set on the lower wafer sheet 14 and joined with the latter into a flat two-layer wafer block.

After the two wafer sheets 14 and 16 are joined together, the negative pressure for the air cushion is turned off and the upper wafer sheet 16 is released by the holding device of the transfer head 19. This concludes the first block formation phase and the transfer head 19 is moved by the handling automaton back to the receiving area and returned to its receiving position 20.

The two-layer wafer block lying on the transport device 18 after the first block formation phase was concluded, forms the preliminary block for the subsequent second block formation phase. In this phase the next upper wafer sheet 16 brought to the receiving area of the sandwiching device is seized by the transfer head 19, reversed with the coated upper side downwards and positioned in the discharge area on the uncoated upper side of the two-layer preliminary block, being joined therewith to form a flat triple-layer wafer block.

After the conclusion of the second block formation phase, the resulting triple-layer wafer block is carried away on the transport device 18.

The FIGS. 5 to 8 schematically show various motion courses during a single block formation phase from the pickup of an upper wafer sheet from the upper level to the delivery of the reversed upper wafer sheet to the preliminary block in the lower level. The FIGS. 5 to 8 schematically show lower and upper wafer sheets coated on the upper side and provided with bulges on the lower side during a single= phase block formation process phase for the production of so-called hollow wafer blocks, each consisting of two coated wafer sheets provided with bulges. These motion courses apply also to flat coated and uncoated wafer sheets, which are joined to form two-layer or multilayer wafer blocks in two-phase or multiple-phase block formation processes. In a multiple-phase block formation process, these motion courses are subject only to minor changes to the extent that they have to be adjusted to the height of the respective preliminary blocks, which increases from block formation phase to block formation phase.

The FIGS. 5 to 8 show respectively an installation for producing two-layered filed wafer blocks, provided with bulges on the upper side and the lower side, so-called hollow wafer blocks.

The installation comprises an upper feeding device 23 which transports the upper wafer sheets 24 in an upper level to the receiving area of a transfer device. At the frontal end of the upper feeding device 23 a sensor 25 is arranged, which registers each upper wafer sheet 24 before it is transported in the receiving area of the transfer device.

The installation comprises further a feeding device 26 which transports the lower wafer sheets 27 to the lower level of the discharge area of the transfer device. At the frontal end of the lower feeding device 26 a sensor 28 is provided, which registers each lower wafer sheet 27 before it is transported in the discharge area of the transfer device.

The discharge area of the transfer device is associated with a transport device 29 arranged downstream of the feeding device 26, on which the finished wafer blocks are carried away.

The transfer device of the installation comprises a multiaxial (not illustrated) handling automaton, which carries a transfer head 30, provided at its frontal side with a holding device for the upper wafer sheets 24. The holding device has a recess 31 open towards the frontal side of the transfer head 30, wherein an upper wafer sheets 24 is received and held by means of negative pressure.

The handling automaton moves the transfer head 30 in a guided motion back and forth between the receiving area 32 close to the upper feeding device 23 and the discharge area 33 associated with the lower transport device 29 of the transfer device. During this guided motion, the transfer head 30 is turned back and forth between its receiving position marked with 30a wherein it points upwards with its frontal side, and its discharge position marked with 30b, wherein it points downwards with its frontal side. In the receiving area 32 the frontal margin 34 of the transfer head turned to its receiving position 30a is arranged in the immediate vicinity of the frontal end of the upper transport device 23, while its rear margin 35 is remotely arranged with respect to the frontal end of the upper feeding device 23. In the discharge area 33, the rear margin 35 of the transfer head turned in its discharge position 30b is closer to the frontal end of the feeding device 26 than is its frontal margin 34.

Figure 5:
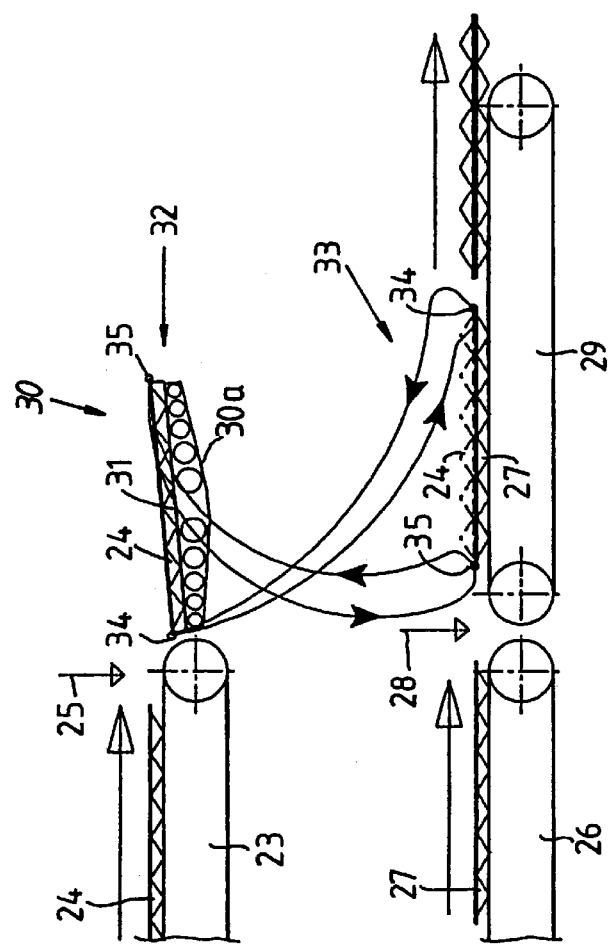
FIG. 5 is a schematic side view of the area of block formation of an apparatus for the production of filled wafer blocks, with the courses or paths of motion during a single-phase block formation.

In the block formation illustrated in FIG. 5, an upper wafer sheet 24 is transported by the upper transport device 23 into the receiving area 32 and introduced in the upwardly open recess 31 of the transfer head turned to its receiving position 30a. The upper wafer sheet is securely held by the transfer head 30 and together with this is lowered in a guided motion into the discharge area 33, thereby being reversed to face downwards with coated frontal side. In the discharge area 33 the reversed upper wafer sheet 24 is positioned with its downwards facing coated frontal side on the upwards facing coated frontal side of a lower wafer sheet 27, and is joined together with the latter to form a two-layer wafer block provided with bulges. The lower wafer block forms the single-layer preliminary block of this block formation. While the transfer head 30 is lowered, its frontal margin 34 is moved forward in the transport direction of the lower transport device 29, while at the same time its rear margin 35 is moved backwards, oppositely to this transport direction. During the guided motion, the transfer head 30 together with the upper wafer sheet 24 held by it, is adjusted to the position assumed on the lower transport device 29 by the preliminary block formed by the lower wafer sheet 27.

Figure 6:
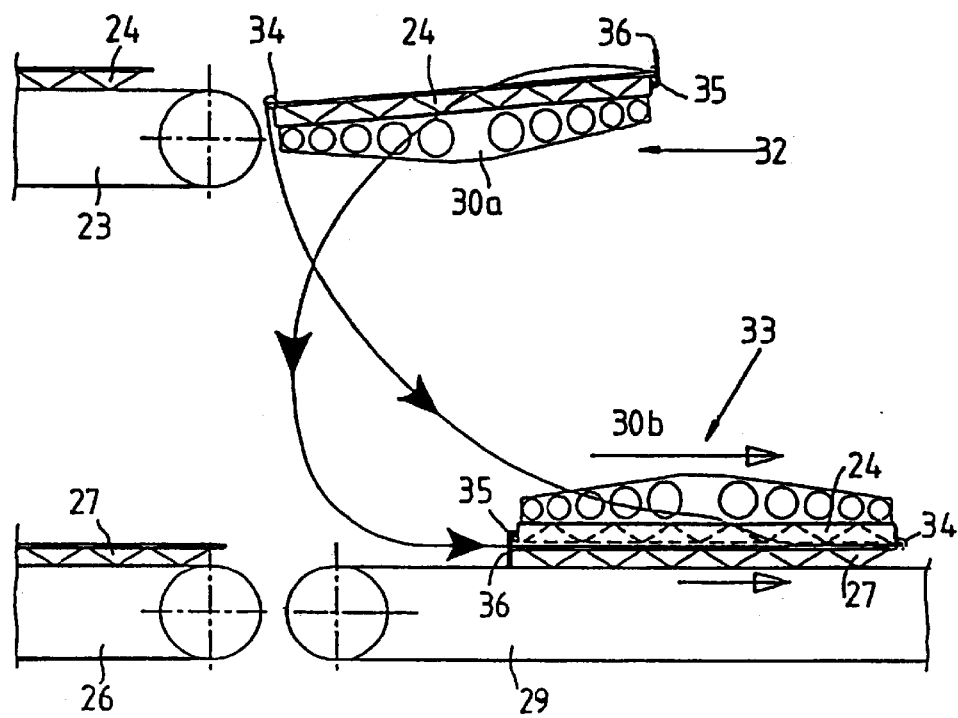
FIG. 6 is a schematic side view of the block formation area with a further embodiment of the transfer device, showing the movements during a single-phase block formation.

In the block formation shown in FIG. 6, the transfer head lowered in the discharge area 33 and turned in its discharge position 30b trails after the preliminary block 27 lying on the lower transport device 29. At the rear margin 35 of the transfer head 30, a rear stop 36 projects over the coated side of the upper wafer sheet 24 held by the transfer head 30. The transfer head 30 is brought with its rear stop 36 from behind to the rear edge of the preliminary block 27 and then pushes the preliminary block 27 further on the lower transport device 29 in its transport direction, until the transfer head 30 has set the upper wafer sheet 24 on the top side of the preliminary block 27.

Figure 7:
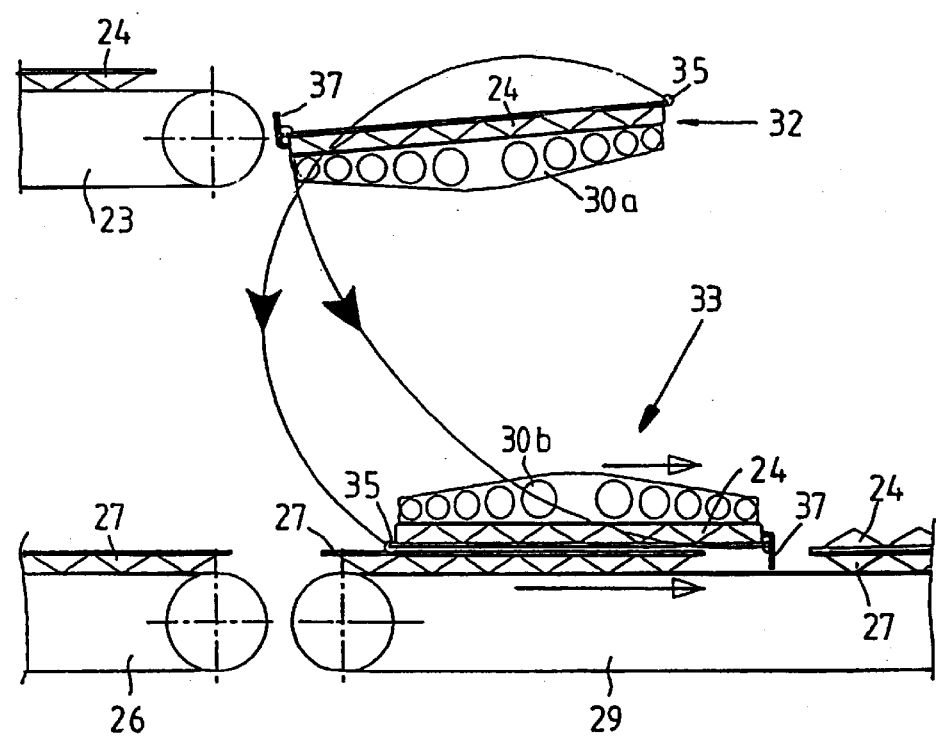
FIG. 7 is a schematic side view of the block formation area with a further embodiment of the transfer device, with the motion paths during a single-phase block formation.

In the block formation shown in FIG. 7, the transfer head lowered into the discharge area 33 and turned to its position 30b is trailed by the preliminary block 27 lying on the lower transport device 29. The transfer head 30 has at is frontal margin 34 a frontal stop 37 which projects over the coated side of the coated wafer sheet 24 held by the transfer head 30. The preliminary block 27 on the transport device 29 trails behind the transfer head 30 until the frontal margin of the preliminary block 27 pushes against the frontal stop 37 of the transfer head 30. Subsequently the preliminary block 27 is held back by the frontal stop 37 of the transfer head 30, until the transfer head 30 has positioned the upper wafer sheet 24 on the upper side of the preliminary block 27.

In the block formation shown in FIG. 8, the preliminary block 27 lying on the lower transport device 29 is lifted from the transport device 29 by an elevating table 38 arranged in the discharge area 33 of the transfer device and is pressed with its upper side from below against the downwards facing side of the reversed upper wafer sheet 24, which is held by the transfer head lowered in the discharge area 33 and turned to its discharge position 30b.

The lower transport device 29 has two or more endless transport belts 29a, arranged next to each other transversely to the transport direction, whose upper faces 29b support the preliminary block 27. The vertically up and down movable elevating table 38 has an upper support surface 39, whose size corresponds to the side of the wafer sheets, and a frontal stop 40 projecting upwards over the support surface 39 for the preliminary blocks 27. The support surface 39 is arranged parallelly to the transport plane of the lower transport device 28 and the stop 40 is perpendicular thereto. In the elevating table 38 longitudinal grooves parallel to the transport direction are provided, which during the lifting of the elevating table 38 receive the upper faces 29b of the transport belts 29a free of contact.

The elevating table 38 can be moved back and forth between a lower release position, a middle locking position and an upper pressure-exerting position. In the release position the elevating table 38 with its stop 40 is lowered under the upper faces 29b of the transport belts 29a. In the locking position the elevating table 38 projects with its stop 40 over the upper faces 29b of the transport belts 29a, while its upper support surface 39 is still located under the upper faces 29b of the transport belts 29a. In the pressure-exerting position the elevating table 38 projects with its stop 40 and its support surface 39 over the upper faces 29b of the transport belts 29a. In the pressure-exerting position the elevating table 38 presses a preliminary block 27, lying on its support surface 39 and supported by it over its entire underside, against a reversed upper wafer sheet 24, which is held by the transfer head arranged in the discharge area 33 and turned to its discharge position 30b.

Figure 8:
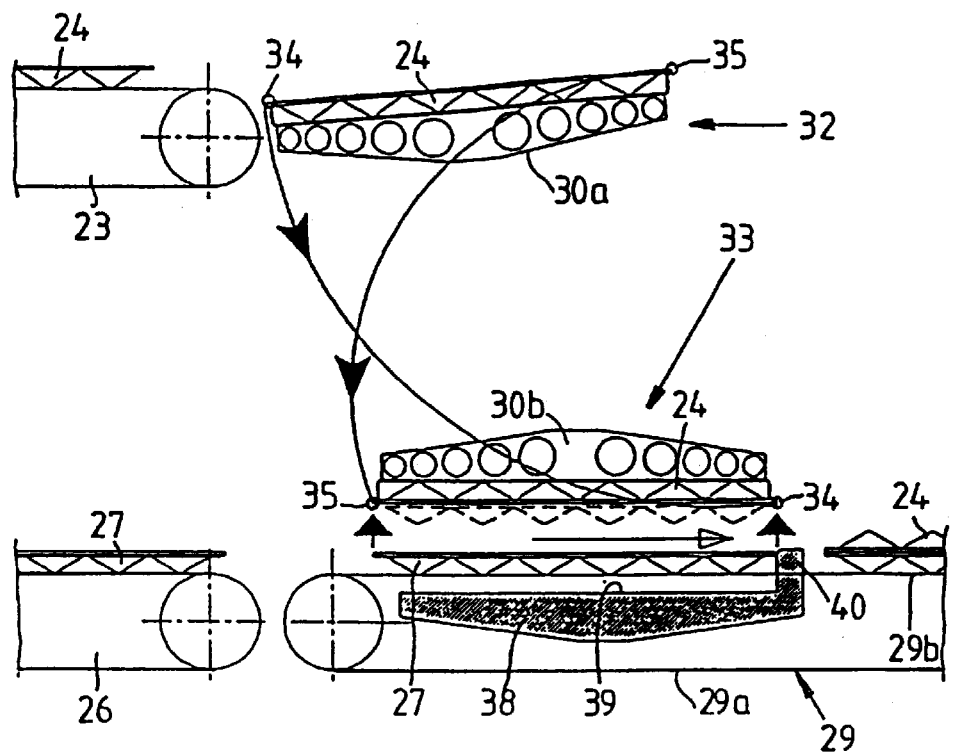
FIG. 8 is a schematic side view of the block formation area for a further embodiment of the transfer device and with an elevating table associated with the lower level, with the movements during a single-phase block formation.
Figure 9:
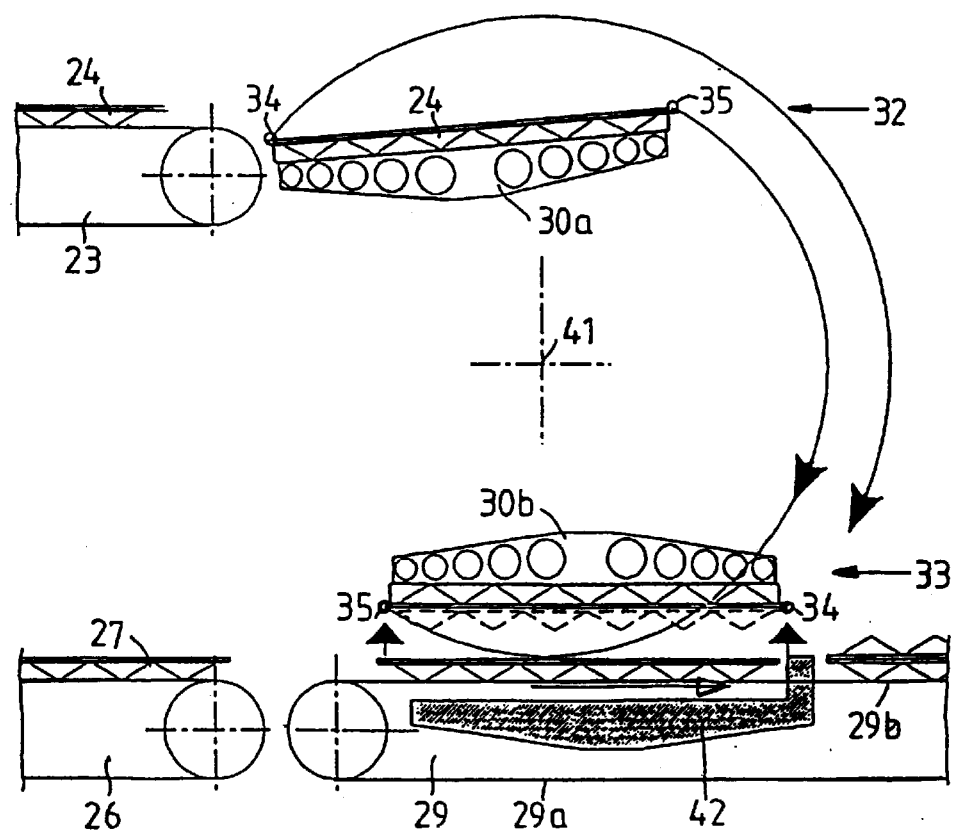
FIG. 9 is a schematic side view of the block formation area with a further embodiment of the transfer device and an elevating table associated with the lower level, with the paths of motion during a single-phase block formation.

FIG. 9 shows an installation similar to FIGS. 5 to 8 in a block formation similar to FIG. 8 with another embodiment of the transfer device. In this transfer device the transfer head 30 provided with a holding device for the upper wafer sheets 24 can be swung about a stationary horizontal pivot axis 41 from the receiving area 32 into the discharge area 33 of the transfer device. The pivot axis 41 is arranged between the transport level formed by the upper transport device 23 and the transport level formed by the lower transport device 26. Like in the embodiment example of FIG. 8, in the discharge area 33 of the transfer device a vertically up and down movable elevating table 42 is provided. In the block formation illustrated in FIG. 9, the preliminary block 27 lying on the transport device 29 is lifted from the lower transport device 29 by the elevating table 42 and pressed from below, with its upper side against the downwards facing side of the reversed upper wafer sheet 24, which is held by the transfer head 30 swung into the discharge area 33 and at the same time into its discharge position. The construction of the lower transport device 29 and of the elevating table 42 correspond to the constructions described in connection with FIG. 8.

During its travel from the upper receiving area 32 to the lower discharge area 33, the transfer head 30 is also swung about the pivot axis 41 from its receiving position 30a into its discharge position 30b. Thereby the transfer head 30 moves the upper wafer sheet 24 held by the same first in the transport direction of the lower transport device 29 over the upper transport level upwards and outwards, and then against this transport direction into the lower discharge area 33. In the discharge area 33, the transfer head which is in its discharge position 30b securely holds the reversed upper wafer sheet 24 and supports it upwards, while the elevating table 42 presses from underneath the preliminary block 27 with its upper side against the downwards facing side of the upper wafer sheet 24 and joins it therewith to form a two-layer wafer block. Subsequently the transfer head 30 releases the upper wafer sheet 24. The two-layer wafer block is deposited on the lower transport device 29 by the elevating table 42, while the elevating table 42 is lowered in its release position. Now the finished wafer block can be carried away by the lower transport device 29. Before or while the next preliminary block is being transported on the lower transport device 29 towards the elevating table 42, the elevating table 42 itself is again lifted up to its locked position.

The FIGS. 10 and 11 show an installation for the production of filled wafer blocks with a transport device 44 defining a lower transport level, associated with a sandwiching device 43. For the production of single-layer, two-layer or multilayer wafer blocks, the sandwiching device 43 is supplied by the transport device 44 with a preliminary block and one or more coated wafer sheets in succession. The preliminary block has an uncoated upper side and an uncoated underside and can consist of a single uncoated wafer sheet, or of two-layer or multilayer wafer blocks. On the transport device 44 a sensor 45 is arranged, which registers preliminary blocks and wafer sheets to be supplied to the sandwiching device 43 in the lower transport level.

The sandwiching device 43 comprises a work head 46 with a frontal side facing the transport device 44, on which a holding device 47 with air cushion is provided. For the purpose of seizing a preliminary block the air cushion is actuated with negative pressure, and for discharging the finished wafer block it is actuated with overpressure. The sandwiching device 43 moves the work head 46 back and forth between particular work positions, which are at different distances from the transport device 44.

The work head 46 is mounted to the free end of an outrigger 48 of a multiaxial handling automaton 49, which moves the work head 46 in a guided motion between back and forth between its work positions. The outrigger 48 is rotatable about a vertical axis 50 and has a support arm 52 swingable about a horizontal bending axis 51, this arm carrying the work head 46 at its free end. Next to the handling automaton a switch box (not shown) is arranged which comprises the control for the handling automaton and which is connected therewith via control lines.

For the production of filled two-layer wafer blocks, each being produced from a first uncoated wafer sheet and a second coated wafer sheet, a single-phase block formation with two work positions of the work head 46 is provided.

During a block formation the work head 46 is moved into a lower work position, wherein it seizes the first uncoated wafer sheet supplied by the transport device 44 as a preliminary block at its uncoated upper side and holds it securely with its holding device. Subsequently the work head 46 with the preliminary block is moved into the second upper work position and joined with the second coated wafer sheet supplied by the transport device 44 to form a two-layer wafer block, which is carried away by the transport device 44. For the next block formation, the work head 46 is again lowered to its first lower work position.

For the production of filled triple-layer wafer blocks, each produced from a first uncoated wafer sheet and a second and a third wafer sheet, both of which are coated, a two-phase block formation with three positions of the work head 46 is provided.

During a block formation in the first block formation phase, the work head 46 is moved in its first lower work position, wherein it seizes the first uncoated wafer sheet supplied as a single-layer preliminary block at its uncoated upper side and holds it securely with its holding device 47. Subsequently the work head 46 is moved with the preliminary block into the second middle work position, wherein the single-layer preliminary block held by the work head 46 is joined with the second coated wafer sheet supplied by the transport device 44 to form a two-layer preliminary block. In the second block formation phase, the work head 46 is moved with the two-layer preliminary block into the third upper work position, wherein the two-layer preliminary block held by the work head 46 is joined with the third coated wafer sheet supplied by the transport device 44 to form a triple-layer wafer block, which is carried away on the transport device 44. For the next two-phase block formation, the work head 46 is again moved to its lower work position.

With each block formation phase, the preliminary block held by the work head 46 increases at its underside by one more wafer layer and one more spread layer. During the block formation the work head 46 is constantly in engagement with the uncoated upper side of the preliminary block it is holding.

For the production of filled, three-layer wafer blocks, each produced from a two-layer preliminary block and a coated wafer sheet, a single-phase block formation with two positions of the work head is provided.

During one block formation the work head 46 is moved into its lower work position, wherein it seizes the two-layer preliminary block supplied by the transport device 44 at its uncoated upper side, and holds it securely with its holding device 47. Subsequently the work head 46 with the two-layer preliminary block is moved into its second upper work position, wherein it is joined with the coated wafer sheet supplied by the transport device 44 to form a triple-layer wafer block, which is carried away on the transport device 44.

If further wafer sheet layers, respectively spread layers, have to be added to the triple-layer wafer blocks, then for each further wafer sheet layer, respectively each further spread layer, a further block formation phase is required, wherein in a further work position of the work head 46 on the underside of the preliminary block held by the work head 46 a further coated wafer sheet supplied by the transport device 44 is added. During a block formation, the height of the preliminary block held by the work head 46 increases from one block formation phase to the next. The distance of the uncoated underside of the preliminary block from the transport device 44 can remain the same during all block formation phases.

According to the invention, the joining of a preliminary block held by the work head 46 with a coated wafer sheet supplied by the transport device 44 can be done in various ways.

The joining can be performed by the handling automaton 49 through the guided motion of the work head 46. Thereby the preliminary block held by the work head 46 can be positioned from above with its uncoated underside on the coated upper side of the wafer sheet lying on the transport device 44, and can be pressed from above against the same, without releasing the preliminary block. Only in the respective last block formation phase the finished wafer block is released by the holding device 47 of the work head 46 in the last position of the work head 46.

The joining can also be performed by an elevating table, which lifts the coated wafer sheet lying on the transport device 44 and presses it from below against the uncoated underside of the preliminary block held by the work head 46 in the respective work position. The construction of the transport device 44 and of the elevating table associated therewith, correspond to the embodiments of the lower transport device 29 and the elevating table 38 described in connection with FIG. 8.

The joining takes place within the motion path of the work head 46, which can be directed in a work area associated with the transport device 44 to the position assumed by the coated wafer sheet on the transport device 44, as well as to the already existing height of the preliminary block held the work head. After the preliminary block and the wafer sheet have been joined, the work head 46 with the wafer block it holds is moved out of the work area. The work area corresponds to the path travelled by the work head 46 above the transport device 44, which reaches from the approach point of the preliminary block held by the work head 46 towards the respective wafer sheet to the departing motion of the work head 46 with the preliminary block increased by one wafer sheet layer.

In a single-phase block formation, the joining of preliminary block and wafer sheet takes place in all successive block formations within a single stationary work area.

In a two-phase or multiple phase block formation, the joining of the preliminary block and the wafer sheet can take place in all block formation phases of a block formation and in all block formation phases of successive block formations, within one stationary work area which is the same for all block formation phases, when the transport device 44 is stopped in each case for the duration of a block formation phase.

If the transport device 44 continues to run during the block formation, then the motion of the work head 46 together with the preliminary block it is holding is synchronized with the motion of the respective wafer sheet, before the preliminary block and the wafer sheet are joined. This can take place in all block formation phases in a stationary work area, whose longitudinal extent in the transport direction of the wafer sheets is bigger than in the case of the respectively stopped transport device 44. However this can also take place in different work areas, each work area being assigned to one block formation phase.

The motion of the respective preliminary block held by the work head 46 of the sandwiching device 43 can also be synchronized with the wafer sheet lying on the transport device 44, as shown in the block formation of FIG. 5, by moving the work head 46 synchronously with the wafer sheet lying on the transport device 44, until the preliminary block held by the work head 46 is positioned on top of the wafer sheet. The motion of the respective preliminary block held by the work head 46 can be synchronized with the wafer sheet lying on the transport device 44, as shown in the block formation of FIG. 6, in that the work head 46 of the sandwiching device 43 trails the wafer sheet lying on the transport device 44, until it catches up with the same. At the rear margin of the work head 46, similar to the transfer head 30 of the transfer device of FIG. 6, a rear stop projects downwards over the uncoated underside of the preliminary block held by the work head 46. The work head is brought close from behind with its rear stop to the rear edge of the wafer sheet and then pushes the same on the transport device 44 in transport direction until the work head 46 has positioned the preliminary block on top of the wafer sheet.

The motion of the respective preliminary block held by the work head 46 can be synchronized with the wafer sheet lying on the transport device 44, as shown in the block formation illustrated in FIG. 7, in that the wafer sheet trails the work head 46 of the sandwiching device 43, similar to the transfer head 30 of the transfer device of FIG. 7, until it catches up from behind with the preliminary block held by the work head 46. At its frontal margin, the work head 46 has a frontal stop similar to the transfer head 30 of the transfer device of FIG. 7, which projects downwards over the uncoated underside of the preliminary block held by the work head 46. The wafer sheet trails after the work head 46, until the frontal edge of the wafer sheet hits against the frontal stop. Subsequently the wafer sheet is held back by the work head 46, until the work head 46 has positioned the preliminary block on top of the wafer sheet.

Figure 12:
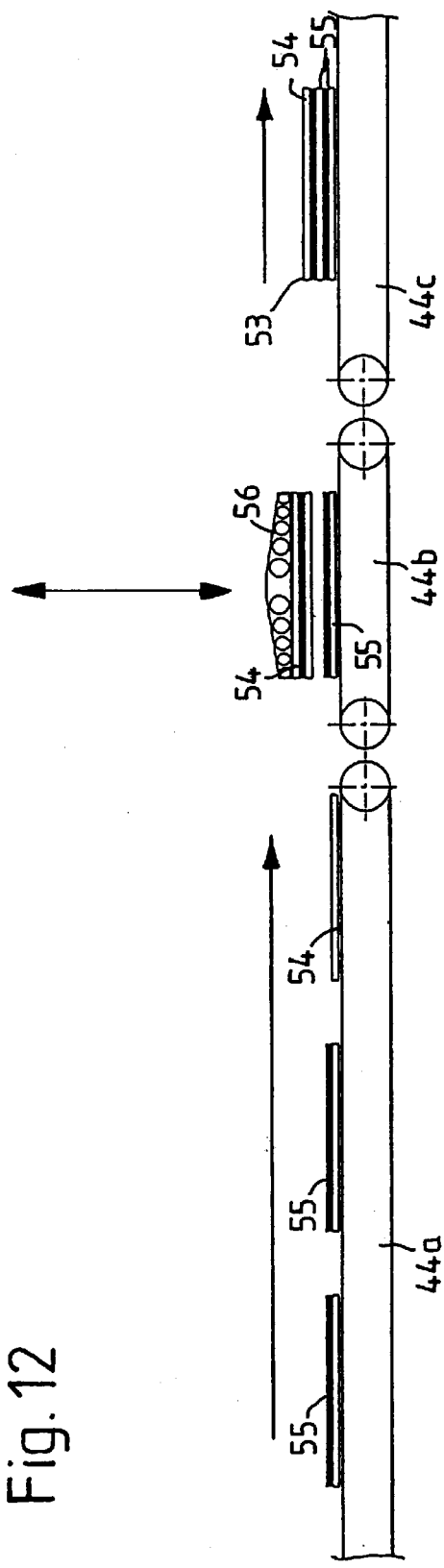
FIG. 12 is a schematic side view of a further apparatus for the production of filled wafer blocks with a sandwiching device to which the wafer sheets are fed on one level.

FIG. 12 shows an installation for the production of triple-layer filled flat wafer blocks 53, whereby uncoated wafer sheets 54 and coated wafer sheets 55 are fed on a multiple part transport device 44a, 44b, 44c to a sandwiching machine, of which only the vertically up and down movable work head 56 is represented. The work head 56 has a downwards pointing frontal side facing the transport device 44, on which a holding device with an air cushion is provided. The air cushion is actuated with negative pressure for seizing the uncoated upper side of a preliminary block, and with overpressure for the release of the finished wafer block. The work head 56 is moved vertically up and down by the sandwiching device into separate work positions, which are at different distances from the transport device 44. The sandwiching device designed as a vertically movable slide carriage or as a multiaxial handling automaton moves the work head 56 in a guided motion back and forth between its work positions.

Figure 13:
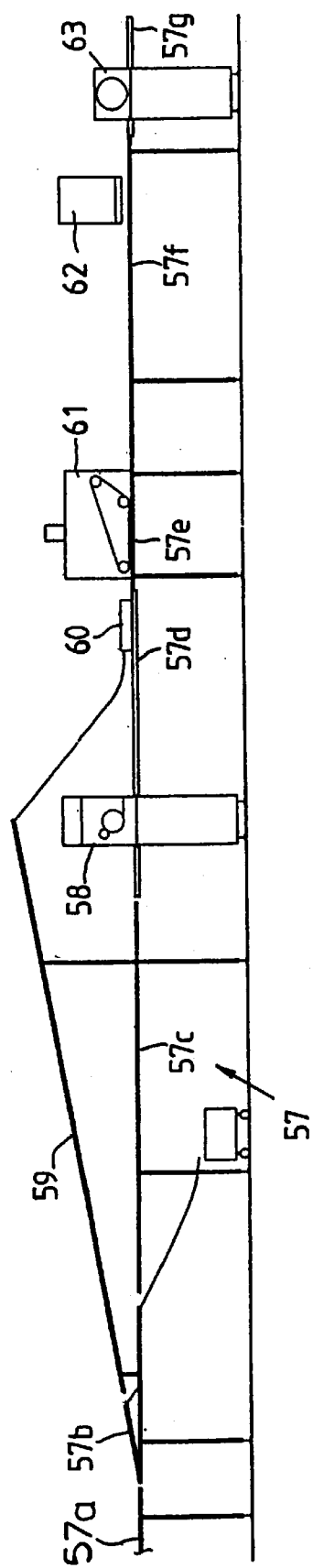
FIG. 13 is a schematic side view of an apparatus for the production of filled wafer blocks, with a section for the production of two-layer filled preliminary blocks and a section for processing the preliminary blocks into multilayer filled wafer blocks.

FIG. 13 shows a further installation for the production of filled wafer blocks. This installation comprises a lower transport device 57 consisting of several transport devices 57a, 57b, 57c, 57d, 57e, 57f, 57g, arranged one after the other in transport direction, defining a lower transport level. On the first transport device 57a uncoated wafer sheets are fed to the installation, which are joined in the installation to form triple-layer filled wafer block. The second transport device 57b is designed as a switch, which divides the uncoated wafer sheets in upper and lower wafer sheets.

The lower wafer sheets are transferred in the lower transport level to the third transport device 57c, which transfers these wafer sheets as an unbroken band to a fourth transport device 57d, on which the wafer sheets pass by a spread applicator 58 and are coated on their upper sides with spread.

The upper wafer sheets are transferred by the transport device 57b to an upper transport device 59, which bridges the third transport device 57c and the spread applicator 58 in that it transports the uncoated upper wafer sheets to a positioning station 60 arranged at the end of the fourth transport device 57d, where the uncoated upper wafer sheets are positioned on top of separate lower coated wafer sheets lying on the fourth transport device 57d.

The fifth transport device 57e is part of a calibration device 61, wherein the uncoated wafer sheets positioned on top of the coated wafer sheets are joined together to form two-layer filled wafer blocks, while the coated wafer sheets pass the calibration station 60 unrestricted.

The two-layer preliminary blocks and the coated wafer sheets are fed on the sixth transport device 57f to a sandwiching device 62 with a vertically up and down movable work head, which in its first work position seizes a two-layer preliminary block supplied by the sixth transport device 57f at its uncoated upper side, holding it securely and lifting it, and in its second work position positions the two-layer preliminary block on top of a coated wafer sheet supplied by the sixth transport device 57f. This is joined with the superposed two-layer preliminary block to form a triple-layer wafer block in a further seventh transport device 57g provided with a calibrating device 63.

This embodiment of the sandwiching device 62 can be replaced by one of the embodiments of the sandwiching device 45 described in connection with FIGS. 10 and 11.

What is claimed is:

1. A method of making filled wafer blocks in a stacking station, said method comprising the steps of:
   1) feeding preliminary blocks at a lower level to said stacking station,
   2) feeding wafer sheets coated on their upper side with spread as coated upper wafer sheets at an upper level to said stacking station,
   3) grasping a coated upper wafer sheet on its underside, turning it upside down and lowering the reversed coated upper wafer sheet to a preliminary block,
   4) joining said lowered reversed coated upper wafer sheet with said preliminary block to form a filled wafer block, and
   5) removing said filled wafer block at said lower level from said stacking station.

2. The method according to claim 1, wherein said coated upper wafer sheet is first turned upside down and lowered to said preliminary block in a single guided movement.

3. The method according to claim 1, wherein said coated upper wafer sheet is lowered to said preliminary block in a single guided movement and turned upside down while being lowered.

4. The method according to claim 1, wherein a coated upper wafer sheet is turned upside down, lowered to a preliminary block and joined with it to form a filled wafer block as a new preliminary block for the next coated upper wafer sheet to be reversed and lowered.

5. The method according to claim 4, wherein at least one further coated upper wafer sheet is turned upside down, lowered to and joined with a previously formed new preliminary block to form a filled wafer block being removed from said stacking station at said lower level.

6. The method according to claim 1, wherein said lowered and reversed coated upper wafer sheet is synchronized with the motion of a moving preliminary block before it is joined with said preliminary block to form a filled wafer block.

7. The method according to claim 1, wherein each lowered reversed coated upper wafer sheet is stopped, before it is joined with a preliminary block to form a filled wafer block.

8. The method according to claim 1, wherein a lowered and reversed coated upper wafer sheet is first synchronized with the motion of a moving preliminary block and then moved synchronously with said moving preliminary block while being joined with said moving preliminary block to form a filled wafer block.

9. The method according to claim 1, wherein a moving preliminary block is first synchronized with the motion of a lowered and reversed coated upper wafer sheet and then moved synchronously with said lowered and reversed coated upper wafer sheet while being joined with said lowered and reversed coated upper wafer sheet to form a filled wafer block.

10. The method according to claim 1, wherein said lowered and reversed coated upper wafer sheet is pressed downwards against said preliminary block to form a filled wafer block.

11. The method according to claim 1, wherein said preliminary block is pressed upwards against said lowered and reversed coated upper wafer sheet to form a filled wafer block.

12. The method according to claim 1, wherein a grasped coated upper wafer sheet is moved to a moving preliminary block in a single guided movement during which said grasped coated upper wafer sheet is turned upside down, lowered to said moving preliminary block, trailing said moving preliminary block, synchronized with said moving preliminary block and pressed downwards against said synchronously moving preliminary block to form a filled wafer block.

13. The method according to claim 1, wherein a grasped coated upper wafer sheet is moved to a moving preliminary block in a single guided movement during which said grasped coated upper wafer sheet is turned upside down, lowered to said moving preliminary block, trailing said moving preliminary block and synchronized with said moving preliminary block and wherein said moving preliminary block is pressed upwards against said synchronously moving, lowered and reversed coated upper wafer sheet to form a filled wafer block.

14. The method according to claim 1, wherein each coated upper wafer sheet is centered in said upper level before it is grasped on its underside and turned upside down.

15. The method according to claim 1, wherein for each filled wafer block to be made, the position of a preliminary block is registered on said lower level by means of sensor monitoring before a coated upper wafer sheet is grasped on its underside and turned upside down.

16. The method according to claim 1, wherein said preliminary blocks are uncoated wafer sheets.

17. The method according to claim 1, wherein said preliminary blocks are wafer sheets coated on their upper side with spread.

18. A method of making filled wafer blocks in a stacking station, said method comprising the steps of:
 1) feeding preliminary blocks coated on their upper side with spread at a lower level to said stacking station,
 2) feeding uncoated wafer sheets as upper wafer sheets at an upper level to said stacking station,
 3) grasping an upper wafer sheet on its underside, turning it upside down and lowering the reversed coated upper wafer sheet to a preliminary block,
 4) joining said lowered reversed upper wafer sheet with said coated preliminary block to form a filled wafer block, and
 5) removing said filled wafer block at said lower level from said stacking station.

19. The method according to claim 18, wherein said upper wafer sheet is first turned upside down and lowered to said coated preliminary block in a single guided movement.

20. The method according to claim 18, wherein said upper wafer sheet is lowered to said coated preliminary block in a single guided movement and turned upside down while being lowered.

21. The method according to claim 18, wherein a lowered and reversed upper wafer sheet is synchronized with the motion of a moving coated preliminary block before it is joined with said coated preliminary block to form a filled wafer block.

22. The method according to claim 18, wherein each lowered reversed upper wafer sheet is stopped, before it is joined with a coated preliminary block to form a filled wafer block.

23. The method according to claim 18, wherein a lowered and reversed upper wafer sheet is first synchronized with the motion of a moving coated preliminary block while being joined with it to form a filled wafer block.

24. The method according to claim 18, wherein a moving coated preliminary block is first synchronized with the motion of a lowered and reversed upper wafer sheet while being joined with it to form a filled wafer block.

25. The method according to claim 18, wherein said lowered and reversed upper wafer sheet is pressed downwards against said coated preliminary block to form a filled wafer block.

26. The method according to claim 18, wherein said coated preliminary block is pressed upwards against said lowered and reversed upper wafer sheet to form a filled wafer block.

27. The method according to claim 18, wherein a grasped upper wafer sheet is moved to a moving coated preliminary block in a single guided movement during which said grasped upper wafer sheet is turned upside down, lowered to said moving coated preliminary block, synchronized with said moving coated preliminary block and pressed downwards against said synchronously moving coated preliminary block to form a filled wafer block.

28. The method according to claim 18, wherein a grasped upper wafer sheet is moved to a moving coated preliminary block in a single guided movement during which said grasped upper wafer sheet is turned upside down, lowered to said moving coated preliminary block and synchronized with said moving preliminary block and wherein said moving coated preliminary block is pressed upwards against said synchronously moving lowered and reversed upper wafer sheet to form a filled wafer block.

29. The method according to claim 18, wherein each upper wafer sheet is centered in said upper level before it is grasped on its underside and turned upside down.

30. The method according to claim 18, wherein for each filled wafer block to be made the position of a coated preliminary block is registered on said lower level by means of sensor monitoring before a coated upper wafer sheet is grasped on its underside and turned upside down.

31. A method of making filled wafer blocks in a stacking station, said method comprising the steps of:
 1) feeding alternatively a preliminary block and at least one wafer sheet being coated on its upper side with spread on a transport level to said stacking station,
 2) grasping a preliminary block on its uncoated upperside, lifting it from said transport level, lowering it above a coated wafer sheet lying on said transport level and pressing it downwards against said coated wafer sheet to form a filled wafer block lying on said transport level,
 3) releasing said filled wafer block, and
 4) removing said filled wafer block from said stacking station on said transport level.

32. The method according to claim 31, wherein for each further wafer sheet layer of the wafer block to be made said grasped preliminary block is once more lifted from said transport level, lowered above a further coated wafer sheet lying on said transport level and pressed downwards against said further coated wafer sheet to form a filled wafer block lying on said transport level.

33. The method according to claim 31, wherein said grasped preliminary block is synchronized with the motion of a moving coated wafer sheet before it is joined with said moving coated wafer sheet to form a filled wafer block.

34. The method according to claim 31, wherein said grasped preliminary block is stopped before it is joined with a coated wafer sheet to form a filled wafer block.

35. The method according to claim 31, wherein said grasped preliminary block is moved to a moving coated wafer sheet in a single guided movement during which said grasped preliminary block is lifted from said transport level, lowered above said moving coated wafer sheet lying on said transport level, trailing said moving coated wafer sheet, synchronized with said moving coated wafer sheet and pressed downwards against said synchronously moving coated wafer sheet to form a filled wafer block.

36. The method according to claim 31, wherein a coated wafer sheet lying on said transport level and trailing said grasped preliminary block is first synchronized with the motion of, and then moved synchronously with, said grasped preliminary block being pressed downwards against said synchronously moving wafer sheet to form a filled wafer block.

37. The method according to claim 31, further comprising the steps: joining wafer sheets and coated wafer sheets in pairs outside said stacking station to form two-layer wafer blocks and feeding said two-layer wafer blocks as said preliminary blocks on said transport level to said stacking station.

38. The method according to claim 31, wherein said preliminary blocks are uncoated wafer sheets.

39. A method of making filled wafer blocks in a stacking station, said method comprising the steps of:
 1) feeding alternatively a preliminary block and at least one wafer sheet being coated on its upper side with spread on a transport level to said stacking station,
 2) grasping a preliminary block on its uncoated upperside, lifting it from said transport level and lowering it into a work position above a coated wafer sheet,
 3) joining said coated wafer sheet with said grasped preliminary block to form a filled wafer block by lifting said coated wafer sheet from said transport level and pressing it upwards against the underside of said preliminary block held in its work position,
 4) releasing said filled wafer block onto said transport level, and
 5) removing said filled wafer block from said stacking station on said transport level.

40. The method according to claim 39, wherein for each further wafer sheet layer of the wafer block to be made said grasped preliminary block is once more lifted and lowered into a work position above a further coated wafer sheet which is lifted and pressed upwards against the underside of said preliminary block held in its working position and wherein said grasped preliminary block is released onto said transport level after the last coated wafer sheet of the wafer block to be made was lifted and pressed upwards against the underside of said preliminary block held in its work position.

41. The method according to claim 39, wherein said grasped preliminary block is synchronized with the motion of a moving coated wafer sheet before it is joined with said moving coated wafer sheet to form a filled wafer block.

42. The method according to claim 39, wherein said grasped preliminary block is stopped before it is joined with a coated wafer sheet to form a filled wafer block.

43. The method according to claim 39, wherein said grasped preliminary block is moved to a moving coated wafer sheet in a single guided movement during which said grasped preliminary block is lifted from said transport level, lowered into a work position above said moving coated wafer sheet lying on said transport level, trailing said moving coated wafer sheet and synchronized with said moving coated wafer sheet which is pressed upwards against the underside of said synchronously moving preliminary block held in its work position.

44. The method according to claim 39, wherein a coated wafer sheet lying on said transport level and trailing said grasped preliminary block is first synchronized with the motion of and then moved synchronously with said grasped preliminary block and then being lifted and pressed upwards against the underside of said synchronously moving preliminary block held in its work position.

45. The method according to claim 39, further comprising the steps: joining wafer sheets and coated wafer sheets in pairs outside said stacking station to form two-layer wafer blocks and feeding said two-layer wafer blocks as said preliminary blocks on said transport level to said stacking station.

46. The method according to claim 39, wherein said preliminary blocks are uncoated wafer sheets.

47. An apparatus for making filled wafer blocks in a stacking station comprising:
 1) a lower transport device for supplying preliminary blocks and removing filled wafer blocks at a lower level,
 2) an upper transport device for supplying wafer sheets as upper wafer sheets at an upper level, and
 3) a sandwiching means for receiving an upper wafer sheet at said upper level, grasping said upper wafer sheet on its underside, turning it upside down, lowering it to a preliminary block and joining said lowered reversed upper wafer sheet with said preliminary block to form a filled wafer block.

48. The apparatus according to claim 47, wherein said sandwiching means comprises a transfer head with a wafer sheet holding device for grasping an upper wafer sheet on its underside, said transfer head being movable from an upper receiving position with said wafer sheet holding device turned upwards and arranged ahead said upper transport device to a lower discharge position with said wafer sheet holding device turned downwards and arranged above said lower transport device.

49. The apparatus according to claim 48, wherein said wafer sheet holding device comprises an air cushion for grasping a wafer sheet on its underside by negative pressure and releasing said grasped wafer sheet by overpressure.

50. The apparatus according to claim 48, wherein said transfer head comprises a frontal stop for the frontal margin of a preliminary block, said frontal stop is arranged at the frontal margin of said transfer head and projects over a wafer sheet held by the wafer sheet holding device of said transfer head.

51. The apparatus according to claim 48, wherein said transfer head comprises a rear stop for the rear margin of a preliminary block, said rear stop is arranged at the rear margin of said transfer head and projects over a wafer sheet held by the wafer sheet holding device of said transfer head.

52. The apparatus according to claim 48, wherein said transfer head is swingable from its upper receiving position to its lower discharge position about a horizontal axis arranged between said upper level and said lower level.

53. The apparatus according to claim 48, wherein said sandwiching means comprises a multiaxial handling automaton associated with said lower transport device for moving and turning said transfer head which is mounted at the free end of a rotatable arm of an outrigger rotatable about a vertical axis and bendable about a horizontal axis and equipped with said rotatable arm which is rotatable about an axis perpendicular to said bending axis.

54. The apparatus according to claim 47, wherein said sandwiching means comprises a movable transfer head with a wafer sheet holding device for grasping an upper wafer sheet on its underside and said sandwiching means further comprises an elevating table associated with said lower transport device for lifting a preliminary block from said lower level, said transfer head being movable from an upper receiving position with said wafer sheet holding device turned upwards and arranged ahead said upper transport device to a lower discharge position with said wafer sheet holding device turned downwards and arranged above said elevating table, said elevating table lifting a preliminary block from said lower level to the lower discharge position of said transfer head for joining said preliminary block with a reversed upper wafer sheet held by said transfer head.

55. The apparatus according to claim 54, wherein said wafer sheet holding device comprises an air cushion for grasping a wafer sheet on its underside by negative pressure and releasing said grasped wafer sheet by overpressure.

56. The apparatus according to claim 54, wherein said transfer head comprises a frontal stop for the frontal margin of a preliminary block, said frontal stop is arranged at the frontal margin of said transfer head and projects over a wafer sheet held by the wafer sheet holding device of said transfer head.

57. The apparatus according to claim 54, wherein said transfer head comprises a rear stop for the rear margin of a preliminary block, said rear stop is arranged at the rear margin of said transfer head and projects over a wafer sheet held by the wafer sheet holding device of said transfer head.

58. The apparatus according to claim 54, wherein said transfer head is swingable from its upper receiving position to its lower discharge position about a horizontal axis arranged between said upper level and said lower level.

59. The apparatus according to claim 54, wherein said sandwiching means comprises a multiaxial handling automaton associated with said lower transport device for moving and turning said transfer head which is mounted at the free end of a rotatable arm of an outrigger rotatable about a vertical axis and bendable about a horizontal axis and equipped with said rotatable arm which is rotatable about an axis perpendicular to said bending axis.

60. The apparatus according to claim 54, wherein said elevating table comprises an upwards facing support surface parallel to said lower level and a stop perpendicular to said lower level for the frontal margin of a preliminary block.

61. An apparatus for making filled wafer blocks in a stacking station comprising:
1) a transport device for alternatively supplying a preliminary block and at least one coated wafer block on the same level, and
2) a sandwiching means for grasping a preliminary block on its uncoated upper side, lifting it from said transport device, lowering it above a coated wafer sheet and joining it with said coated wafer sheet to form a filled wafer block.

62. The apparatus according to claim 61, wherein said sandwiching means comprises a work head with a holding device for grasping a preliminary block on its uncoated upperside, said work head being movable into a lower position and lowerable at least one upper work position for joining said grasped preliminary block with a coated wafer sheet to form a filled wafer block.

63. The apparatus according to claim 62, wherein said holding device comprises an air cushion for grasping a preliminary block on its coated upperside by negative pressure and releasing said grasped preliminary block by overpressure.

64. The apparatus according to claim 62, wherein said work head comprises a frontal stop for the frontal margin of a coated wafer sheet, said frontal stop is arranged at the frontal margin of said work head and projects below a preliminary block held by the holding device of said work head.

65. The apparatus according to claim 62, wherein said work head comprises a rear stop for the rear margin of a coated wafer sheet, said rear stop is arranged at the rear margin of said work head and projects below a preliminary block held by the holding device of said work head.

66. The apparatus according to claim 62, wherein said sandwiching means comprises a handling automaton associated with said transport device for moving said work head which is mounted at the free end of an outrigger bendable about a horizontal axis.

67. The apparatus according to claim 66, wherein said outrigger of said handling automaton is rotatable about a vertical axis.

68. An apparatus according to claim 61, further comprising a preceding sandwiching section for making filled two-layer wafer blocks supplied as preliminary blocks at said transport level to said stacking station, wherein along said transport device are arranged in succession:
1) an upper transport device for supplying uncoated wafer sheets,
2) a station for positioning uncoated wafer sheets on separate coated wafer sheets lying on said transport device, and
3) a calibrating device for joining uncoated and coated wafer sheets to form a filled two-layer wafer blocks.

69. The apparatus according to claim 61, wherein said sandwiching means comprises a movable work head with a holding device for grasping a preliminary block on its uncoated upperside and said work head being movable into a lower position and said sandwiching means further comprises an elevating table associated with said transport device for lifting each preliminary block and each coated wafer sheet from said transport level, said work head being movable from a lower preliminary block grasping position to at least one upper work position for joining the grasped preliminary block with a coated wafer sheet lifted by said elevating table.

70. The apparatus according to claim 67, wherein said holding device comprises an air cushion for grasping a preliminary block on its uncoated upperside by negative pressure and releasing said grasped preliminary block by overpressure.

71. The apparatus according to claim 69, wherein said work head comprises a frontal stop for the frontal margin of a coated wafer sheet, said frontal stop is arranged at the frontal margin of said work head and projects below a preliminary block held by the holding device of said work head.

72. The apparatus according to claim 69, wherein said work head comprises a rear stop for the rear margin of a coated wafer sheet, said rear stop is arranged at the rear margin of said work head and projects below a preliminary block held by the holding device of said work head.

73. The apparatus according to claim 69, wherein said sandwiching means comprises a handling automaton associated with said transport device for moving said work head which is mounted at the free end of an outrigger bendable about a horizontal axis.

74. The apparatus according to claim 73, wherein said outrigger of said handling automaton is rotatable about a vertical axis.

75. The apparatus according to claim 69, wherein said elevating table comprises an upwards facing support face parallel to said lower level and a stop perpendicular to said lower level for the frontal margin of said preliminary blocks and said coated water sheets.

76. An apparatus according to claim 69, further comprising a preceding sandwiching section for making filled two-layer wafer blocks supplied as preliminary blocks at said transport level to said stacking station, wherein along said transport device are arranged in succession:

1) an upper transport device for supplying uncoated wafer sheets,
2) a station for positioning uncoated wafer sheets on separate coated wafer sheets lying on said transport device, and
3) a calibrating device for joining uncoated and coated wafer sheets to form a filled two-layer wafer blocks.

* * * * *